United States Patent [19]
Papierniak et al.

[11] Patent Number: 6,151,601
[45] Date of Patent: Nov. 21, 2000

[54] COMPUTER ARCHITECTURE AND METHOD FOR COLLECTING, ANALYZING AND/OR TRANSFORMING INTERNET AND/OR ELECTRONIC COMMERCE DATA FOR STORAGE INTO A DATA STORAGE AREA

[75] Inventors: Karen A. Papierniak, Fenton, Minn.; James E. Thaisz, Lincroft, N.J.; Anjali M. Diwekar, Matawan, N.J.; Luo-Jen Chiang, Freehold, N.J.

[73] Assignee: NCR Corporation, Dayton, Ohio

[21] Appl. No.: 08/968,728

[22] Filed: Nov. 12, 1997

[51] Int. Cl.[7] .................................................. G06F 17/30
[52] U.S. Cl. ................................................ 707/10; 707/1
[58] Field of Search ..................... 707/1, 2, 8, 9, 707/10, 102, 104

[56] References Cited

U.S. PATENT DOCUMENTS

| | | | |
|---|---|---|---|
| 5,668,988 | 9/1997 | Chen et al. | 707/101 |
| 5,752,246 | 5/1998 | Rogers et al. | 707/10 |
| 5,802,511 | 9/1998 | Kouchi et al. | 707/2 |
| 5,825,751 | 10/1998 | Papierniak et al. | 370/248 |
| 5,867,799 | 2/1999 | Lang et al. | 707/1 |

Primary Examiner—Thomas G. Black
Assistant Examiner—Sanjiv Shah

[57] ABSTRACT

A computer system collects, analyzes and/or transforms Internet and/or electronic commerce data of service providers. The Internet and/or electronic commerce data includes one or more of business operational data and network operational data. The mapping system includes a database storing the Internet and/or electronic commerce data for interrogation by the CSP, and at least one computer station including data transformation and database load utilities. The computer station performs one or more of the functions: of transforming and organizing the business operational data; analyzing, and organizing the web server operational data pertaining to web page requests, accesses, and browsing into the format suitable to be loaded into said database; analyzing and organizing the Internet operational data pertaining to network sessions and accesses; correlating the network sessions, and authorization and application access data to customers; creating directories of applications; translating raw system data pertaining to Internet and/or electronic commerce applications into a business context; and correlating the business operational data and the network operational data into one or more datasets.

31 Claims, 23 Drawing Sheets

FIG. 12

| | |
|---|---|
| Hardware Options (minimum) | WM UNIX Platform - 2 Pentiums 166MHz CPUs, 128MB of base memory plus 32MB per user up to 5 users.<br>WM NT Server Platform - 2 Pentiums 166MHz CPUs, 128MB base memory plus 32MB per user up to 5 users.<br>Browser, DSS, Data Mining Client Platform - Any PC, Laptop, Server connected to the WM UNIX or NT server. Data Mining client hardware must have 1024x768 256 color graphics capability. |
| Software Base Options (minimum) | UNIX Server - UNIX SVR4 MP-RAS v3.0 or greater.<br>NT Server - Microsoft NT v4.0.<br>Browser, DSS and Data Mining Client - Windows 95, NT v4.0, Netscape 3.0 or Internet Explorer 3.0, ODBC, and Xvision. |
| Database Software Options (minimum) | Teradata V2 R1.1.1 or greater for NCR UNIX SVR4 MP-RAS<br>Oracle for Microsoft NT<br>Microsoft SQL Server on Microsoft NT |
| Database Connectivity Software (minimum) | Teradata CLI R4.0 for NCR UNIX SVR5 MP-RAS<br>Teradata ODBC R2.02 for Microsoft NT<br>ODBC included in Oracle for NT<br>ODBC included in MS SQL Server<br>Both 16 and 32 bit ODBC drivers for Windows 95 and NT 4.0 clients |
| Information Access or Decision Support and Data Mining Software | Info Access/DSS - Platinum Technology, Inc. InfoBeacon, MicroStrategy DSS Agent, Server, Web; Information Advantage Inc. Decision Suite<br>Data Mining - Angoss Software International KnowledgeSEEKER, NCR Knowledge Discovery Workbench, SABRE Decision Technologies Datawise |
| WebMining Tools | Examples of Data Source descriptions, business rules, and reports, Logical Data Models Utilities for Extraction Utilities and Data Transformation Base Structures and schema for each DB supported. |

FIG. 16

| | CUSTOMER BUSINESS SYSTEMS | | | | | | INTERNET/WEB SYSTEMS | | | | | REFERENCE SYSTEMS | | | |
|---|---|---|---|---|---|---|---|---|---|---|---|---|---|---|---|
| | BILLING SYSTEM | SUBSCRIBER INFORMATION | BUSINESS CLIENT INFORMATION | ACCESS SERVICES DESCRIPTION | HOSTING/CONSULTING SERVICE DESCRIPTION | INVOICES | POP PROFILES | REMOTE ACCESS SERVER PROFILES | REMOTE ACCESS SERVER LOGS | SERVER ACCESS LOGS | WEB APPLICATION DESCRIPTIONS | SUBSCRIBER BASE DEMOGRAPHICS | INDIVIDUAL SUBSCRIBER DEMOGRAPHICS | WEBSITE CONTENT TAXONOMY | PREFERENCE/INTEREST TAXONOMY |
| SERVICES PORTFOLIO MANAGEMENT | | | | | | | | | | | | | | | |
| *ACCESS SERVICES* | | | | | | | | | | | | | | | |
| SESSION MANAGEMENT | X | | | | | | X | | X | | | | | | |
| REVENUE MANAGEMENT | | X | | X | | | | | | | | | | | |
| SUBSCRIBER MANAGEMENT | | X | | X | | | | | | | | | | | |
| SERVICES DEMOGRAPHICS | | | | | | | | | | | | X | | | |
| *HOSTING/CONSULTING SERVICES* | | | | | | | | | | | | | | | |
| REVENUE MANAGEMENT | X | | X | | | X | | | | | | | | | |
| BUSINESS CLIENT MANAGEMENT | | | X | | | X | | | | | | | | | |
| SUBSCRIBER BASE MANAGEMENT | | | | | | | | | | | | | | | |
| *SUBSCRIBER VALUE* | | | | | | | | | | | | | | | |
| SUBSCRIBER PROFITABILITY MANAGEMENT | | X | | | | X | X | | X | X | | | | | |
| SUBSCRIBER VALUE-BASED MARKETING | | X | | | | X | | | X | X | X | | | X | X |
| *SUBSCRIBER PROFILE* | | | | | | | | | | | | | | | |
| SESSION PROFILE MANAGEMENT | | X | | | | | X | X | X | | | | | | |
| PREFERENCES/INTERESTS-BASED MARKETING | | | | | | | | X | | X | X | | | | X |
| DEMOGRAPHICS-BASED MARKETING | | | | | | | X | | | | | | X | | |
| APPLICATION MANAGEMENT | | | | | | | | | | | | | | | |
| *ON-LINE CONTENT EFFECTIVENESS* | | | | | | | | | | | | | | | |
| CONTENT ACTIVITY MANAGEMENT | | | | | | | X | | | X | X | | | X | |
| WEB PROGRAMMING MANAGEMENT | | | | | | | | | | X | X | | | X | |

RELATIONSHIPS:

———+———+ ONE-TO-ONE

———+———< ONE-TO-MANY

———>———< MANY-TO-MANY

PARTICIPATION:
MANDATORY    OPTIONAL
———+|———o<

FIG. 18

| TABLE TYPE | DEFINITION |
|---|---|
| FACT | A RELATIONSHIP TABLE THAT LINKS TWO OR MORE ENTITIES INTO A MANY-TO-MANY RELATIONSHIP. |
| DIMENSION | A DATA TABLE THAT DESCRIBES EACH ENTITY. |
| LOOKUP | AN EXTENSION TO A DIMENSION TABLE USED TO EXPEDITE INDEXING ON ALTERNATE KEYS. |
| SUBSET | AN EXTENSION TO A DIMENSION TABLE USED TO STORE OPTIONAL DATA THAT MAY NOT PERTAIN TO EVERY OCCURRENCE OF THE RELATED ENTITY. |

FIG. 20

| Business Operation Management - Subscriber Services Metrics ||| 
|---|---|---|
| Table Name | Table Type | Description |
| Service_Subscriber | Fact | Facilitates tracking the number of subscribers for each dial-up or dedicated line service over a range of time periods. Enables management to track trends in the customer base as a result of business practices or competitive influences. |
| Service_Rate | Fact | Facilitates tracking billing rates for each dial-up or dedicated line service over a range of time periods. Enables billed revenue to be calculated based on rates effective at the given time. Important for comparing revenue over various periods of time. |
| Billed_Revenue | Fact | Tracks individual billing transactions for each subscriber at the time of billing. Used to calculate total billed revenue on a per subscriber basis for any point in time for calculating profitability indices. E.g. Most/least profitable customers. |
| Subscriber_Status | Fact | Indicates the subscriber's status (e.g. active, terminated) over the time dimension. |
| Subscriber_Addr_Status | Subset | Used for subscriber address changes over time. The subscriber record contains the current address. This record indicates past addresses. |
| Date_time | Dimension | Allows queries from various perspectives across the time dimension. Currently, the granularity for this feature set is one month. |
| Billing_Master | Dimension | Describes the types of transactions for which bills are rendered. Enables management to track revenue generated for each type of product and service. |
| Service_Description | Dimension | Describes the attributes of each dial-up or dedicated access service. Enables management to track revenue and subscribers for each type of service over time. |
| Subscriber | Dimension | Identifies and describes the person or entity who subscribes to the services offered by the CSP. |
| Subscriber_Services | Subset | Allows for subscribers that have more than one service. |

COMPUTER ARCHITECTURE AND METHOD FOR COLLECTING, ANALYZING AND/OR TRANSFORMING INTERNET AND/OR ELECTRONIC COMMERCE DATA FOR STORAGE INTO A DATA STORAGE AREA

BACKGROUND OF THE INVENTION

1. Field of the Invention

The present invention is generally related to a computer architecture and method for collecting, analyzing and/or transforming Internet and/or electronic commerce data for storage into a data storage area for subsequent retrieval and analysis, and more particularly, to a computer architecture and method for collecting, analyzing and/or transforming Internet and/or electronic commerce data for storage in a data storage area for subsequent retrieval and analysis to support collection and analysis of Internet and/or electronic commerce data over or from the World Wide Web for Internet Service Providers (ISPs).

2. Background of the Related Art

More and more people are using the Internet as a method of communicating, advertising and shopping for and purchasing goods. The sale of Internet services is growing at an amazing rate. The number of projected users into the year 2000 is dramatically impacting the communications industry both from the standpoint of an opportunity to realize new business and as a concern due to the potential loss of traditional revenue sources. FIG. 1 illustrates this dramatic increase sales in World Wide Web (WWW or web) servers, a summary of which is presented below:

| WORLD WIDE WEB SERVER SALES FORECAST | | | | | |
|---|---|---|---|---|---|
| | 1995 | 1996 | 1997 | 1998 | 1999 |
| Intranet | 475 | 2,673 | 5,483 | 9,210 | 13,133 |
| Internet | 621 | 979 | 1,410 | 1,777 | 2,159 |
| Total | 1,096 | 3,652 | 6,893 | 10,987 | 15,292 |

The explosive growth in PCs, Servers and Internet related software has cultivated a need for companies to better understand their customer's needs. To better understand these needs, many gigabytes of data must be collected and analyzed to arrive at the best way to service the customer.

Market and industry analysts alike, believe that the Internet will prove to be the most significant innovation in modern history since the light bulb and automobile. The method in which we perform daily business operations will be changed forever due to this new technology. Many technology based companies in the computer industry are scrambling to outline new products and services using and exploiting the Internet as a vehicle to increase market share and revenue, while increasing productivity and cutting operational costs. FIG. 2 is an illustration of the estimated growth in web users over the next several years.

In an effort to meet the above needs of digesting the vast amounts of information on the web, companies have designed many browsers and millions of web pages to access, retrieve and utilize this information. In addition to the Internet, companies have set up local "intranets" for storing and accessing data for running their organizations. However, the sheer amount of available information is posing increasingly more difficult challenges to conventional approaches.

A major difficulty to overcome is that information contained on the web or web pages are often dispersed across the network at many sites. It is often time-consuming for a user to visit all these sites. One conventional approach used to access this information more effectively is called a search engine. A search engine is actually a set of programs accessible at a network site within a network, for example a local area network (LAN) at a company or the Internet and World Wide Web. One program, called a "robot" or "spider," pre-traverses a network in search of documents and builds large index files of keywords found in the documents.

A user of the search engine formulates a query comprising one or more keywords and submits the query to another program of the search engine. In response, the search engine inspects its own index files and displays a list of documents that match the search query, typically as hyperlinks. When a user activates one of the hyperlinks to see the information contained in the document, the user exit's the site of the search engine and terminates the search process.

Search engines, however, have their drawbacks. For example, a search engine is oriented to discovering textual information only. In particular, they are not well-suited to indexing information contained in structured databases, e.g. relational databases, voice related information, audio related information, and the like. Moreover, mixing data from incompatible data sources is difficult in conventional search engines.

Another disadvantage with conventional search engines is that irrelevant information is aggregated with relevant information. For example, it is not uncommon for a search engine on the web to locate hundreds of thousands of documents in response to a single query. Many of those documents are found because they coincidentally include the same keyword in the search query. Sifting through search results in the thousands, however, is a daunting task.

Accordingly, we have determined that there is a need to be able to effectively collect, translate, consolidate and/or clean the data and/or provide useful marketing information indicative of events occurring on the web. For example, data which indicates where a user has been in prior sessions may be useful in designing future products accessible via the web. We have also determined that there is a need for an architecture and method used to support and analyze Internet and/or electronic commerce over or from the World Wide Web for ISPs and CSPs.

We have further determined that there is the need for an architecture and method used to correlate user, application, and access functions. We have also determined that there is a need to provide a tool set that can easily communicate with, or become a subset of, an existing scaleable data warehouse to provide Internet marketing decision support. Unfortunately, conventional architectures and/or techniques are unable to organize and present this information in an efficient manner.

SUMMARY OF THE INVENTION

To overcome the above-detailed disadvantages and shortcomings of the prior art, it is a feature and advantage of the present invention to effectively collect, translate and refine the data and/or provide useful marketing information indicative of events occurring on the web. It is another feature and advantage of the present invention to collect data which indicates where a user has been in prior sessions, and which may be useful in designing future products accessible via and for the web.

It is another feature and advantage of the present invention to provide an architecture and method used to support and analyze Internet and/or electronic commerce data over the World Wide Web for ISPs/CSPs.

It is another feature and advantage of the present invention to provide an architecture and method used to correlate user, application, and access functions.

It is another feature and advantage of the present invention to provide an architecture and method used to translate interval naming conventions into general marketing terms or areas.

It is another feature and advantage of the present invention to provide a tool set that can easily communicate with, or become a subset of, an existing scaleable data warehouse to provide Internet marketing decision support.

In the attainment of the same, the present refining invention provides an architecture and method of supporting, collecting, translating and analyzing Internet and/or electronic commerce data over the World Wide Web for ISPs/CSPs. The present invention also includes one or more computer systems employing the method, a computer readable memory storing the medium, and a method for storing the synchronization process in memory and in a storage device.

The present invention combines improved methods of data collection with enhanced analysis techniques to exploit the vast amount of information available through emerging uses of the web, and other Internet-based systems. The results can be used as part of a customer's decision support system to allow better (e.g., more statistically valid) business decisions to be made faster.

The present invention concentrates on opportunities within, for example, the ISP sector of the telecommunications industry, and provides ISPs the insight into their customer's services usage, demographics, and behavior patterns. Through this insight, ISPs should be able to support their decisions in such areas as customer retention, service pricing and profitability, and target marketing campaign using analytical methods based on customer and market data. Furthermore, ISPs can provide the knowledge and capabilities to the hosted business customers in order for those customers to gain similar insight into their users to make effective and customer-driven business decisions.

In addition, the present invention is complementary with the current Internet Services Delivery Platform program. One environment where the present invention operates is on and over where the consumer or business customer is able to utilize the ISP's web-based resources through a combination of access and backbone networks which, in turn, are connected to, for example, the global Internet to interface with the rest of the Internet resources. The access networks consist of many Point of Presences (POPs) which provide dial-up (e.g., analog/digital, ISDN) access service or dedicated digital (e.g., Frame Relay, ISDN) access service using either modem pool technologies and/or access server/router for the customers.

The access networks also provide Dynamic Host Communication Protocol (DHCP) services, a Proxy Cache Server, and a firewall to facilitate the service administration, address translation, security authentication and/or authorization, and web operation efficiency. The backbone networks, consisting of switches and routers, optimize the transport between the access networks and the Internet Service Center. Internet Service Centers may provide Web Hosting Service and Electronic Commerce Applications.

The present invention provides an architecture supporting value-added services to improve the operation and services of ISPs. The present invention leverages data warehouse and data mining techniques augmented with networking elements and web technologies. The goal of the present invention is to provide the customers with dynamic, flexible, and adaptable interfaces and systems to fully utilize and track the interactivity of the new Web medium. As a result, decision makers will be able to access decision support information via secure network a simple (ease of use), timely (fast enough), usable (valuable) and personalized (customized) fashion. Furthermore, this information will allow the customers to make intelligence decisions and take timely actions to achieve their business goals.

The present invention also is a decision support solution targeted at a Commerce Service Provider (CSP) and Internet Service Provider (ISP). A CSP/ISP is a service provider who offers a full range of value-added services such as electronic commerce applications. Its purpose is to help CSPs/ISPs to better manage their business, customer base, and services by leveraging areas of expertise in data warehousing, data retrieval and data transformation.

The present invention was designed in view of the following goals which we have determined:
1. Understand a user's behavior over the Internet.
2. Understand electronic commerce over the Internet.
3. Understand the dynamics of the ISP/CSP business.
4. Determine the type of decision support needed to effectively run an Internet-based service business.
5. Understand how to leverage data warehouse and data retrieval assets into this environment.

The present invention further includes a data warehouse—data retrieval solution that is tailored to Internet-based applications and services. One of its primary purposes is to allow ISP/CSP decision-makers to exploit the intelligence contained in datasets derived from the following environments:
   ISP/CSP business operations.
   Internet or Web-based applications.
   Web-based commerce applications.

Additionally, the decision-support information derived for specific applications can be provided by ISPs/CSPs to their electronic commerce clients as a service. The "discovery" of knowledge from each dataset is beneficial to ISPs/CSPs and their customers for the deep insights that it provides into business dynamics and customer behavior.

The scope of WebMining includes a data warehouse that extracts data from web logs as well as various business operational data bases. The warehouse, in turn, sources three datamarts: one focused on business operations, one on the CSPs customers and one on e-commerce applications and on-line content. On-line content, in this context means, applications provided by the CSP as a service to his/her subscribers. The integration of web data to business data is key.

Web warehouse and datamarts provide information in a business context, not a web site context. This is an important distinction. Although the system logs from one source of input to the warehouse, the data extracted from them is refined and translated into a business context before it is correlated with other operational data (customer, billing, product, etc.) and put into the warehouse. In other words, the warehoused data is refined to represent products being sold through e-commerce applications, advertisements being seen by customers, specific content being viewed by customers, etc., not URLs. The extraction utilities and translation libraries that provide content for the warehouse will be as important to our offering as the decision-support functions at the back end.

The systems elements of the present invention include:
1. tracking module: systems to collect, interpret, analyze, translate, refine and correlate customer Internet usage, Web/Internet application data, e-commerce application data and other operational data.
2. storage module: Scaleable Data Warehouse to structure, organize, store and manage the data.
3. data visualization: business decision-support solutions based on knowledge analysis and discovery of the data contained in the storage module.

The benefits of the present invention include:
1. providing decision support and operational information for the ISP/CSP to enable new/improved value-added services, allow the implementation of equitable and value-based pricing, achieve better quality of service, manage capacity, and add bill-back capabilities for charge back scenarios.
2. providing to the ISP's/CSP's customers valuable information such as decision support for proactive, targeted marketing, usage and customer preferences feedback on the web applications, usage information for business access, direct decision support access for specific ISP/CSP customers' applications.

The WebWarehouse designer of the present invention provides a core design that is tailored for the decision-support functions. Extensions to this design, however, may be optionally required to accommodate the ISP's/CSP's operational data and, perhaps, any additional decision-support requirements that surfaced during the data discovery phase. WebWarehouse designer contains two main components: a logical data model and a formatted library. The logical data model provides overall descriptions of the WebWarehouse. This description determines how well the WebWarehouse can integrate additional dataset, how effective the access of WebWarehouse will be for query and report. The Formatted File Library provides the intermediate classifications such as process characterizations, customer descriptions, preference determination, and behavior patterns. These classifications can beneficially be reused in different technical process and different customer problems.

The tracking module or WebTrack (WebMap) of the present invention is a process and set of tools that transforms and refines data from the customer's data sources into the WebWarehouse. WebTrack (WebMap) leverages existing standard RDBMS tools whenever possible. WebTrack (WebMap) uses standard utilities and data transformation utilities to extract, scrub and transform operational data into a dataset suitable for loading into WebWarehouse. WebTrack (WebMap) parses, analyzes, validates and/or organizes Internet/Web data prior to correlating it to operational data. WebTrack (WebMap) leverages many customer application parameters that are identified during the data discovery process, such as directories of on-line or e-commerce content.

In accordance with one embodiment of the invention, a computer system collects, analyzes and/or transforms Internet and/or electronic commerce data of Commerce Service Providers (CSPs) and Internet Service Providers (ISPs) for storage into a data storage area for subsequent retrieval and analysis. The electronic commerce data includes one or more of business operational data, network operational data, and Internet and/or electronic commerce server data. The system includes a database storing the Internet and/or electronic commerce data for interrogation by the ISP/CSP, and at least one computer station including data transformation and database load utilities. The computer station performs one or more of the functions: of transforming and organizing the business operational data; analyzing and organizing the network operational data pertaining to network sessions and accesses; correlating the network sessions, and authorization and Internet server access data to customers; creating directories of categories; translating raw system data pertaining to Internet and/or electronic commerce applications into a business context; and correlating the Internet data, business operational data, and the network operational data into one or more datasets.

One or more computer memory products are also provided. One or more computers memory stores, and one or more computers executes a program including the above process steps.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

For a more complete understanding of the present invention and the advantages thereof, reference is now made to the following descriptions taken in conjunction with the accompanying drawings in which like numbers designate like parts, and in which:

FIG. 12 is a table providing additional hardware, software, database, and information tool options that may be used in conjunction with the present invention;

FIG. 16 is an illustration of the WebWarehouse data sources for the services portfolio management, subscriber base management, and application management;

FIG. 18 is a table key indicating different types of tables;

FIG. 20 is an exemplary table indicating subscriber service metrics data stored by the WebWarehouse designer and received from the data discoverer process;

NOTATIONS AND NOMENCLATURE

Figure 1:
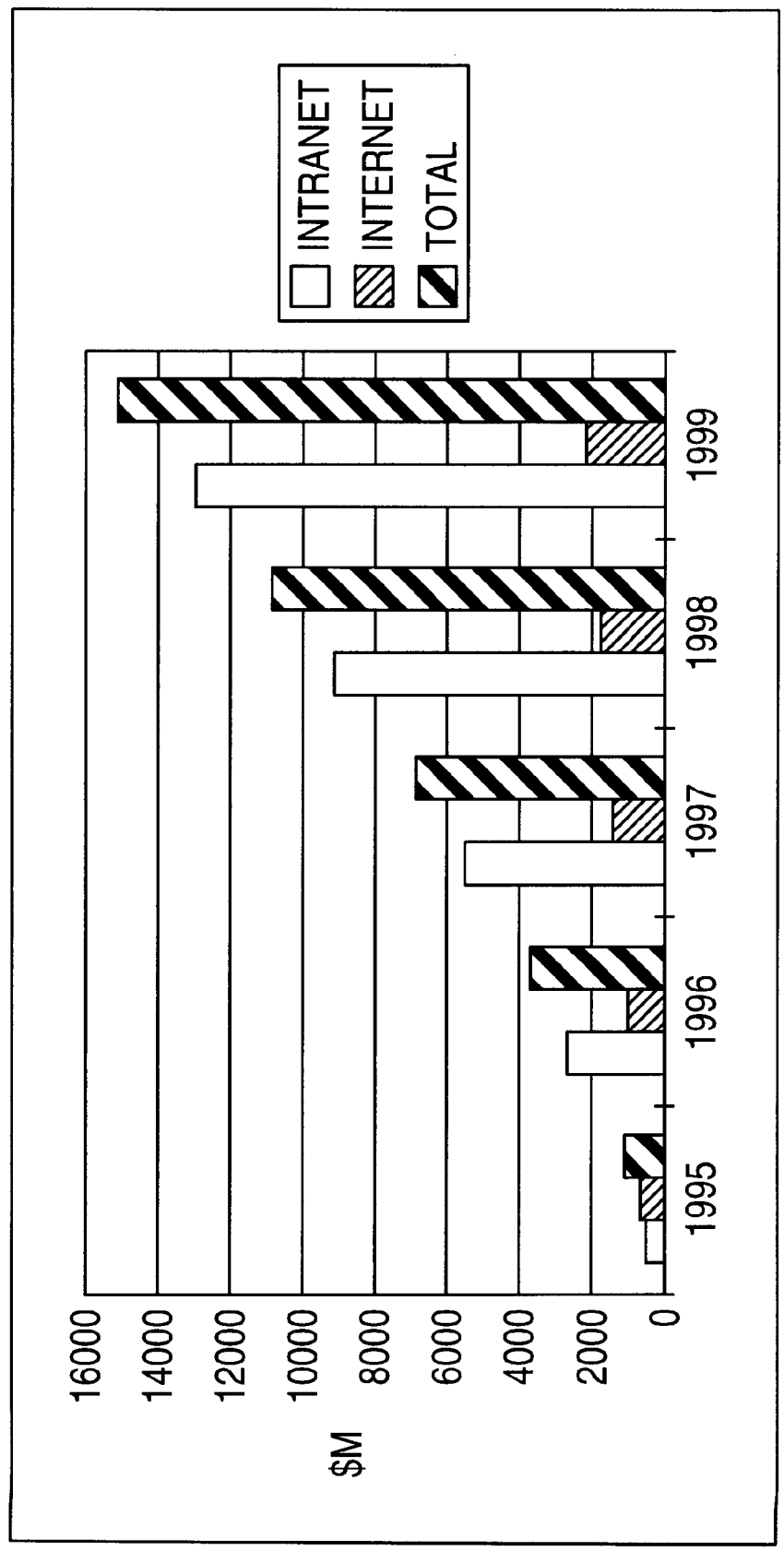
FIG. 1 is an illustration of the dramatic increase sales in World Wide Web servers.
Figure 2:
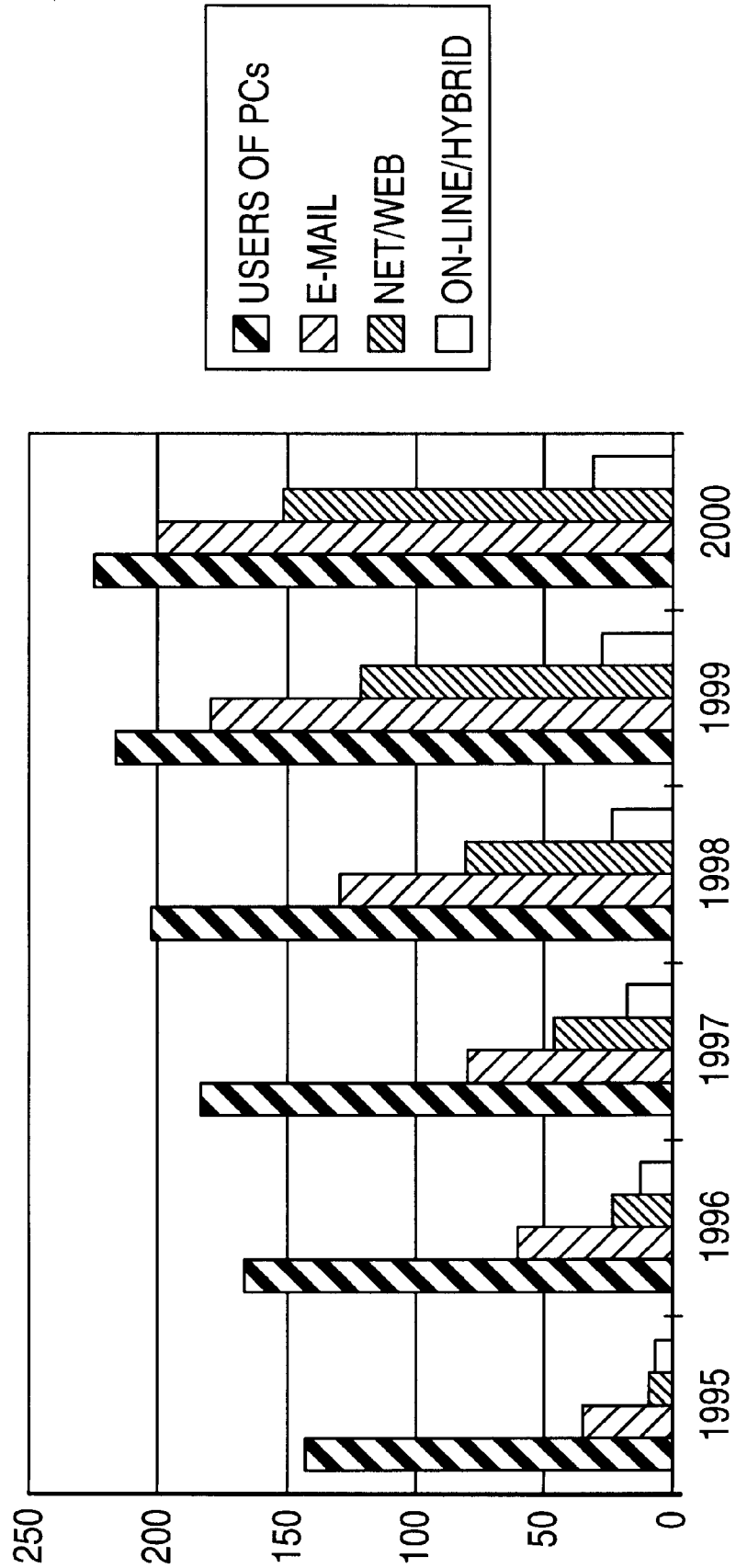
FIG. 2 is an illustration of the estimated growth in web users.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

BEST MODE FOR CARRYING OUT THE INVENTION

The present invention provides an architecture and method of supporting, collecting, refining, and analyzing Internet and/or electronic commerce/transactions over or from (hereinafter "over" or "from" are interchangeable) the World Wide Web for ISPs and/or CSPs. The present invention also includes a computer system employing the method, one or more computer readable memory storing the medium, and a method for storing the synchronization process in a memory and in a storage device. The present invention provides tools that provide the necessary collection and analytical capabilities to derive knowledge from raw data collected from the web. In addition, the present invention provides scalability of storage capacity, to meet a customer's growing client needs.

In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present invention combines improved methods of data collection and translation with enhanced analysis techniques to exploit the vast amount of information available through emerging uses of the web, and other Internet-based systems. The results can be used as part of a customer's decision support system to allow better (e.g., more statistically valid) business decisions to be made faster.

The present invention concentrates on opportunities within, for example, the ISP sector of the telecommunications industry, and provides ISPs the insight into their customer's services usage, demographics, and behavior patterns Through this insight, ISPs should be able to support their decisions in such areas as customer retention, service pricing and profitability, and target marketing campaign using analytical methods based on customer and market data. Furthermore, ISPs can provide the knowledge and capabilities to the hosted business customers in order for those customers to gain similar insight into their users to make effective and customer-driven business decisions.

The present invention provides a complete data warehouse/data mining solution for Internet/Electronic commerce-based applications and services. Its features include:

A modular design that scales in size as well as functionality.

It runs on a series of platforms ranging from single processors to massively parallel systems.

A full range of design and implementation tools.

Extraction and transformation programs tailored for the Internet and electronic commerce operating environment.

A choice of relational database management systems that includes MS SQL Server, Oracle, and Teradata.

A comprehensive selection of decision-support capabilities.

The present invention's modular design, hardware platforms and tools enable customers to select a decision-support system that is consistent with the financial maturity of their business. As the business grows and decision-support needs become more complex, the platforms described herein can be upgraded in size as well as functionality.

The present invention provides decision-support capabilities to help ISP's/CSP's manage their business from several perspectives:

Providing high quality Internet Service and Electronic Commerce to subscribers as a foundation for higher value, more profitable services.

Managing the customer base to optimize profits and value.

Providing on-line content and services as a value-added incentive to attract and retain communities of subscribers, provide sources of advertising revenue, and potentially, to attract commerce clients.

Providing decision-support information, as a potential fee-based service, to business clients to help them manage their Internet, web or electronic commerce applications that are being hosted by the ISP/CSP.

Since a specific ISP/CSP may not be involved in every aspect of the business described above, the present invention's decision-support capability is modularized to allow a ISP/CSP to select the functionality that make sense for his/her business.

The present invention's modular structure allows Internet and/or electronic commerce-based applications and services to be managed from three perspectives:

1. Business Operations Management to monitor and understand:
    Key business metrics (revenue, expenses, profitability, subscriber base).
    Factors that impact quality of service.
    The impact of marketing initiatives or competitive influences.
2. Customer-Base Management to understand the relative value, behavioral characteristics, and preferences of individual subscribers or customers.
3. E-Commerce Management to measure the success of:
    E-Commerce Applications—applications provided by the ISP/CSP's or their business clients to conduct commerce over the Internet.
    On-line content and other applications provided by the ISP/CSP to add value to the service offering.

Figure 3:
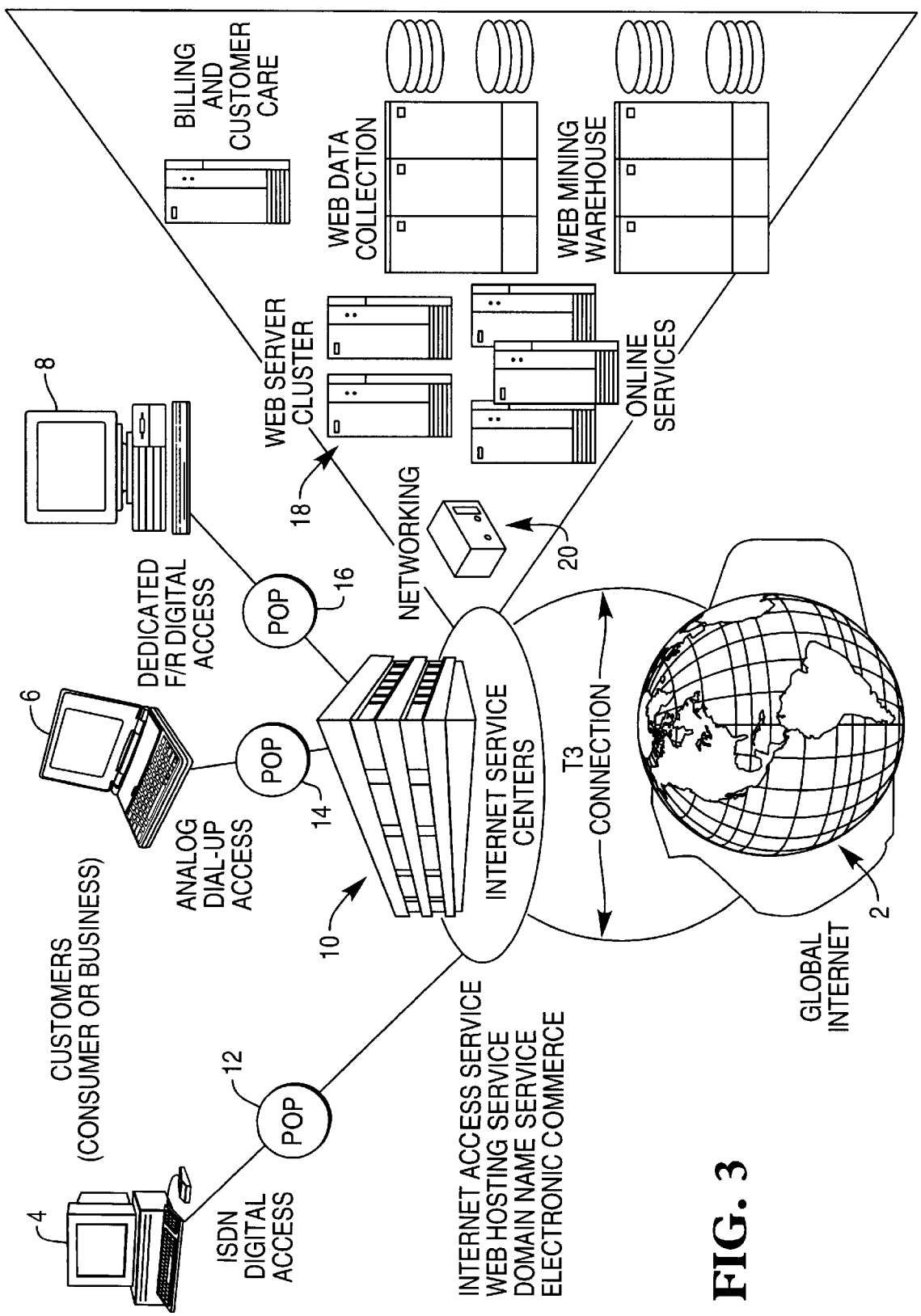
FIG. 3 is an illustration of an Internet Services Delivery Platform program indicative of one environment where the present invention operates.

In addition, the present invention is complementary with the current Internet Services Delivery Platform program. One environment where the present invention operates is illustrated in FIG. 3. Within this environment, the consumer or business customer 4, 6, 8 is able to utilize the ISP's/CSP's web-based resources through a combination of different access and backbone networks such as ISDN digital access, analog dial-up access, and/or dedicated access lines described below. These networks are, in turn, are connected to the Global Internet 2 via, for example, an Internet Service Center 10 to interface with the rest of the Internet resources.

The access networks consist of many Point of Presences (POPs) 12, 14, 16 which provide dial-up (analog/digital, ISDN) access service or dedicated digital (Frame Relay, ISDN) access service using either modem pool technologies and/or access server/router for the customers. The access networks also provide Dynamic Host Communication Protocol (DHCP) services, a Proxy Cache Server, and a firewall to facilitate the service administration, address translation, security authentication and/or authorization, and web operation efficiency. The backbone networks, consisting of switches and routers, optimize the transport between the access networks and the Internet Service Center 10.

Internet Service Centers 10 may also provide Web Hosting Service and Electronic Commerce Applications. One implementation of Internet Service Centers for ISPs/CSPs is a single site with multiple servers 18 (Web Server Cluster) interconnected through a campus network 20. In addition, Internet Service Centers optionally provide Authentication Service, Domain Name Service, Mail Service, News Service, Provisioning Service, and Network Management Service.

The present invention provides value-added services to improve the operation and services of ISPs/CSPs. The present invention leverages data warehouse and data mining techniques augmented with networking elements and web technologies. The goal of the present invention is to provide the customers with dynamic, flexible, and adaptable interfaces and systems to fully utilize the interactivity of the new Web medium. As a result, decision makers will be able to access decision support information through a secure network in a simple (ease of use), timely (fast enough), usable (valuable) and personalized (customized) fashion. Furthermore, this information will allow the customers to make intelligence decisions and take timely actions to achieve their business goals.

The benefits of the present invention include:
1. providing decision support and operational information for the ISP/CSP to enable new/improved value-added services, allow the implementation of equitable and value-based pricing, achieve better quality of service, manage capacity, and add bill-back capabilities for charge back scenarios.
2. providing to the ISP/CSP customers valuable information such as decision support for proactive, targeted marketing, usage and customer preferences feedback on the web applications, usage information for business access, direct decision support access for specific ISP/CSP customers' applications.

Figure 4:
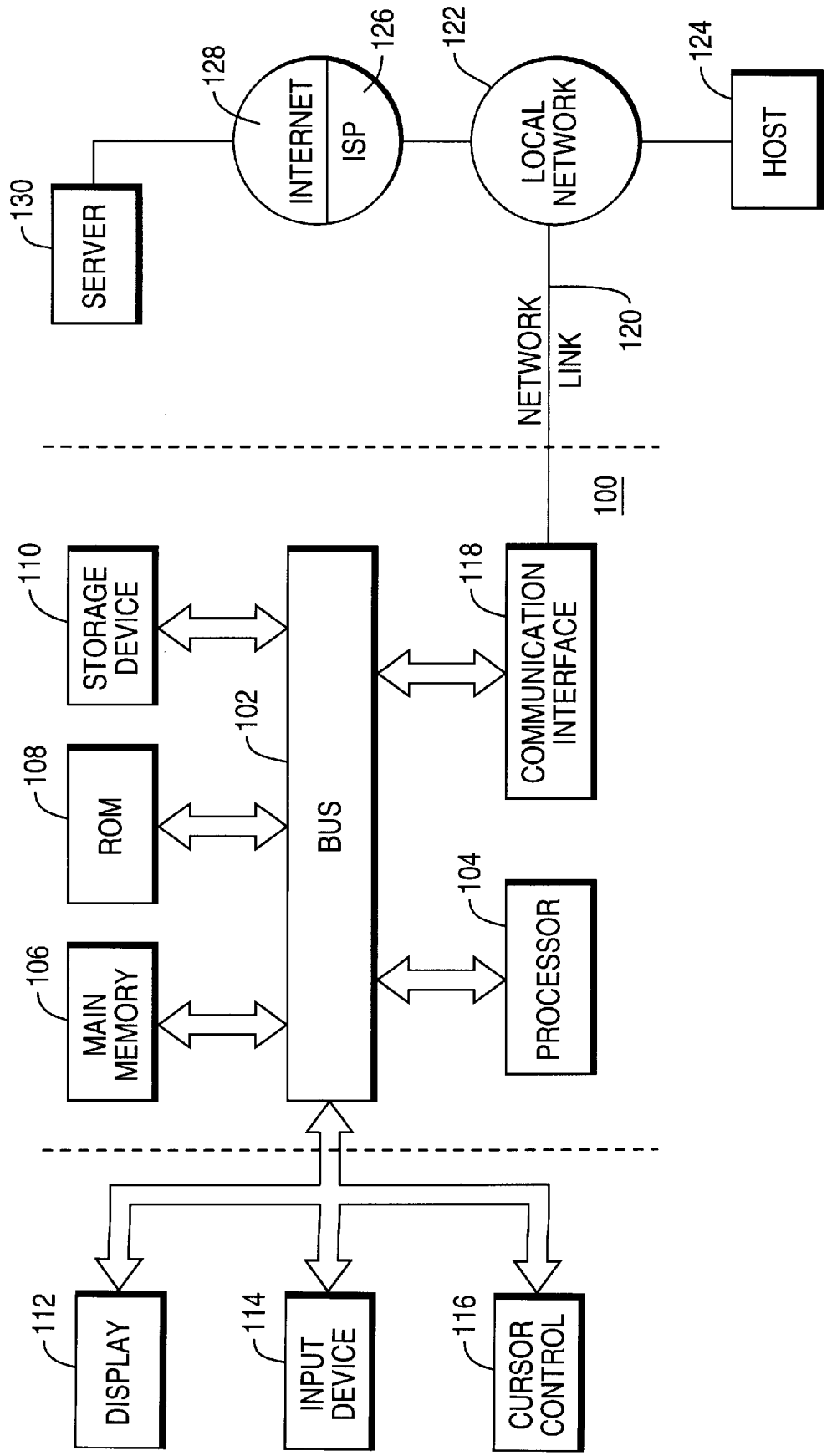
FIG. 4 is a high-level block diagram of a computer system with which the present invention can be implemented.

FIG. 4 is a high-level block diagram of a computer system with which the present invention can be implemented. FIG.

4 is a block diagram which illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104.

Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of one or more computer systems 100 for supporting, collecting, and analyzing Internet and/or electronic commerce over and/or from the World Wide Web for ISPs/CSPs. According to one embodiment of the invention, computer system 100 performs the synchronization in response to processor 104 executing sequences of instructions contained in main memory 106. Such instructions may be read into main memory 106 from another computer-readable medium, such as storage device 110.

However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read.

Execution of the sequences of instructions contained in main memory 106 causes processor 104 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to bus 102. Communication interface 108 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an ISP or CSP 126. ISP or CSP 126 in turn provides data communication services through the world wide packet data communication network now commonly referred to as the "Internet" 128. Server 132, web server or proxy server, is used by ISP 126 for data collection purposes. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 140 might transmit a requested code for an application program through Internet 128, ISP 126, local network 122 and communication interface 118. In accordance with the invention, one such downloaded application provides for the synchronization method as described herein. Of course, the present invention may also be implemented on multiple computer systems.

The received code may be executed by processor 104 as it is received, and/or stored in storage device 110, or other non-volatile storage for later execution. In this manner, computer system 100 may obtain application code in the form of a carrier wave.

Figure 5:
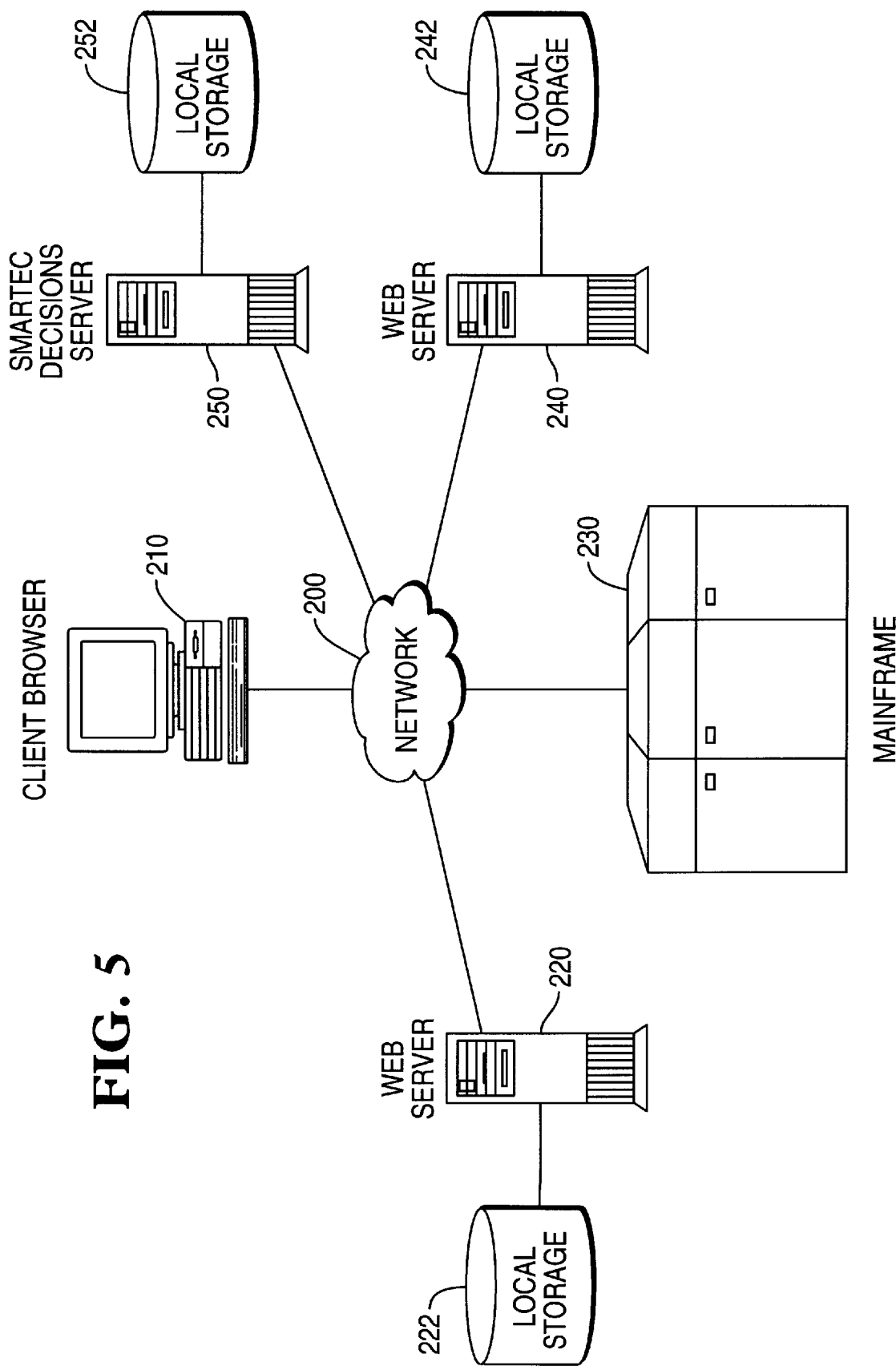
FIG. 5 is a diagram of a network in which the present invention can be implemented.

FIG. 5 is a diagram of a network in which the present invention can be implemented. Referring to FIG. 5, depicted is a network 200 within which the present invention may be implemented. SmartEC server, according to one embodiment of the present invention, gathers information dynamically from one or more data sources, which may be located at different servers and may have incompatible formats, and outputs the information for the user according to predetermined criteria discussed below. A SmartEC Server 240 takes the information from Web Server 240 and translates and puts it into the WebWarehouse.

The predetermined criteria may be defined by human operators according to their own needs, purposes, and preferences as part of the configuration of the server. Alternatively, the predetermined criteria may be determined based on system-defined user privileges. For example, users with a higher clearance, and/or security level may be able to obtain more information than users with a lower clearance, security level. Multiple information models and visual representations may be defined for any server.

A user may access the web server 220 by executing a web browser at client 210. Web browsers are well-known in the art, and are readily available from such corporations as Netscape Communications Corp. and Microsoft Corp. In order to access the web server 220, the user at client browser 210 activates a hyperlink having a URL (Uniform Resource Locator).

In the exemplary URL, the network address of the web server 220 is specified as "www.server.com" and the optional portion of the URL after the question mark (?) hold user specified parameters. When the hyperlink is activated, the web server 220 receives a request to initiate an session, specified by parameters embedded in the URL. In response, the web server 220 gathers information from one or more data sources.

The data or information sources can have incompatible formats, e.g. web page, relational database, spreadsheet, text file, etc. The data sources can be stored at a plurality of sites, for example, locally with respect to the web server 220, such as a hard disk at local storage 222, or externally at another site in the network, e.g. at mainframe 230. In fact, the data source can even be another, remote information web server 240.

Figure 6:
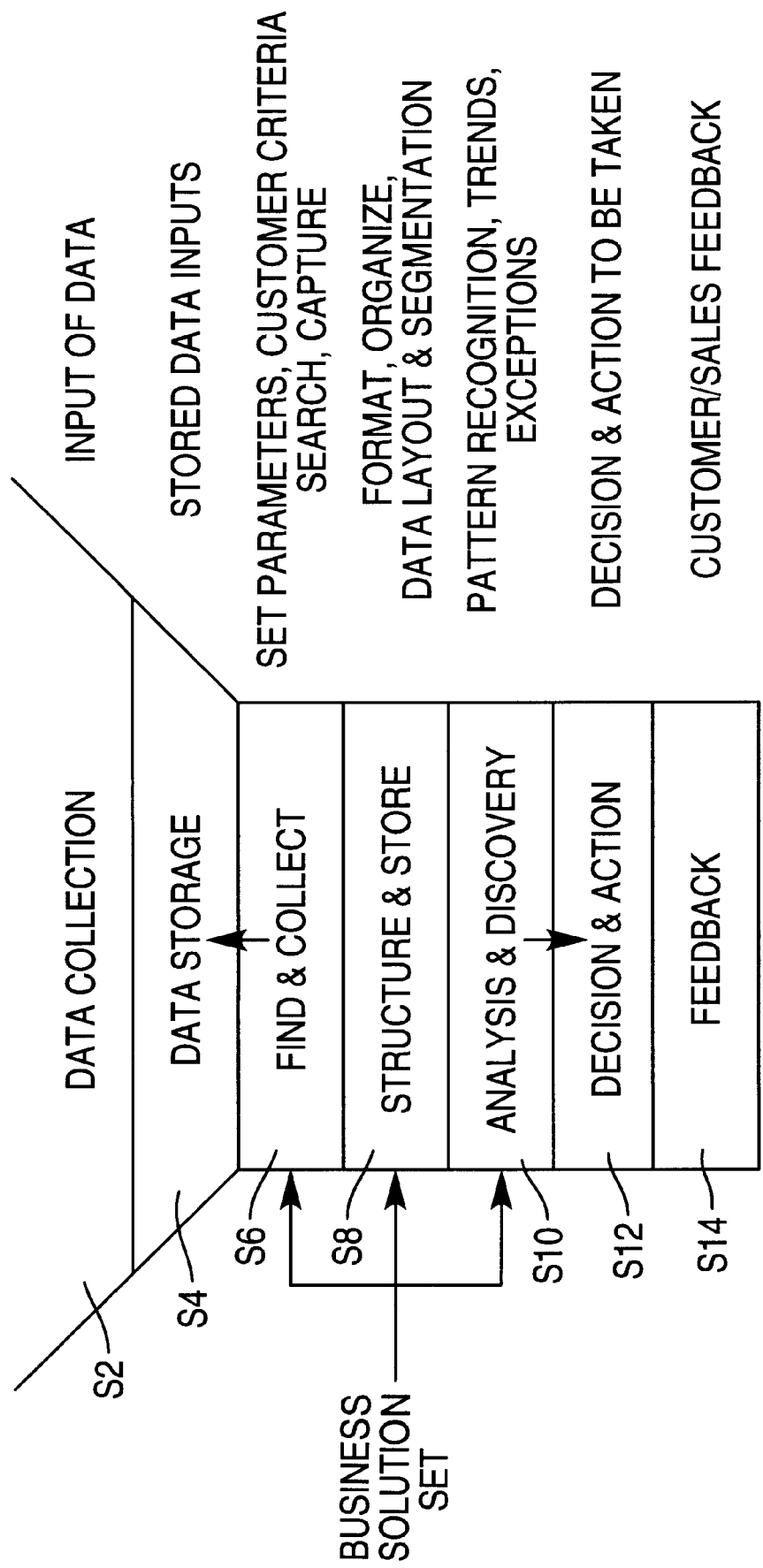
FIG. 6 is a flow chart of the framework of the decision analysis process of the present invention.

The decision analysis process shown in FIG. 6 describes a framework of what is required to provide the business solution set. The architecture and process of the present invention includes the necessary data to solve specific business problems. As opposed to many traditional methods of collection and storage for data warehouse and mining, the present invention focuses on data collection of Web/Internet information and data storage methods using Web technologies in distributed environments.

As a result, data collection and data storage processes S2, S4 are focused and continuous efforts, instead of general and discrete approaches. The present invention also allows the proper archive of the collected information for statistic and analytic manipulation. The present invention effectively and interactively presents the resulting business solutions.

Specifically, three aspects of the processes are provided by the present invention business solution set:

1. Find and collect: this process S6 must determine what data elements are required. It is also necessary to know whether the data is available in open, closed, or registered environments. In order to execute the capture and collection of the data, the ability to set policy and operation parameters must be provided to the user to allow options for data searching and collection based upon their dynamic and changing business needs. Furthermore, this process should also deal with when and how the data collection should be executed.

The whereabouts of the required data, sometimes, can be known or unknown, internal or external. The ability to locate the data and synthesize the multiple sources of data into useful information is important as the technology evolves and matures. The following data collection options are also provided:

real-time: the time between locating the data and collecting the data is negligible or about at the same time. These two activities are closely related and the actions are closely coordinated.

on-line: the time between locating the data and collecting the data is short because either (1) the data requires a certain duration to accumulate meaningful volume, or (2) the importance of the data collection is not imminent. These two activities are loosely related and actions are loosely coordinated.

off-line: the time between locating the data and collecting the data is long and these two activities are separate and can be unrelated events, and actions need not be coordinated at all.

2. Structure and store: this process S8 involves parsing, categorizing, indexing, and formatting of the collected data. The processed data must be organized in a structured way (i.e., the data layout and segmentation). The intent of this process is to arrange the data and/or information in a form where useful long term and policy-related knowledge can be easily used and derived.

3. Analysis and discovery: this process S10 recognizes the patterns, trends, and exceptions of the data and/or the information based on statistic and analytic manipulation techniques such as clustering, artificial intelligence, etc. The goal is to provide the customers with recommended actions for their decision making S12.

All these three processes are iterative in nature. The feedback process S14 among the processes, and also from the users and customers, will establish the foundation of the continuing improvement. In addition, all three processes require user-friendly interfaces to facilitate information exchange. These user interfaces are important parts of the present invention to allow solution navigation, iterative learning, and decision guidance.

The following outlines the system elements and preliminary data required for the present invention. The present invention intends to complement the Internet service delivery platform and provide the differentiation for our complete suite of Internet solutions for Internet Service Providers and/or Commerce Service Providers in the communication industry. The assumptions of the configuration are:

all systems are interconnected, all systems (users, servers) can be Web-accessible.

The approach we take in the present invention is to establish a generic solution framework, but with specific focus, at least initially, on the vertical industry (ISPs in the communication industry) and functionally on customer retention and profitability. The potential applicability for horizontal platform functionality requires further investigation.

Figure 7:
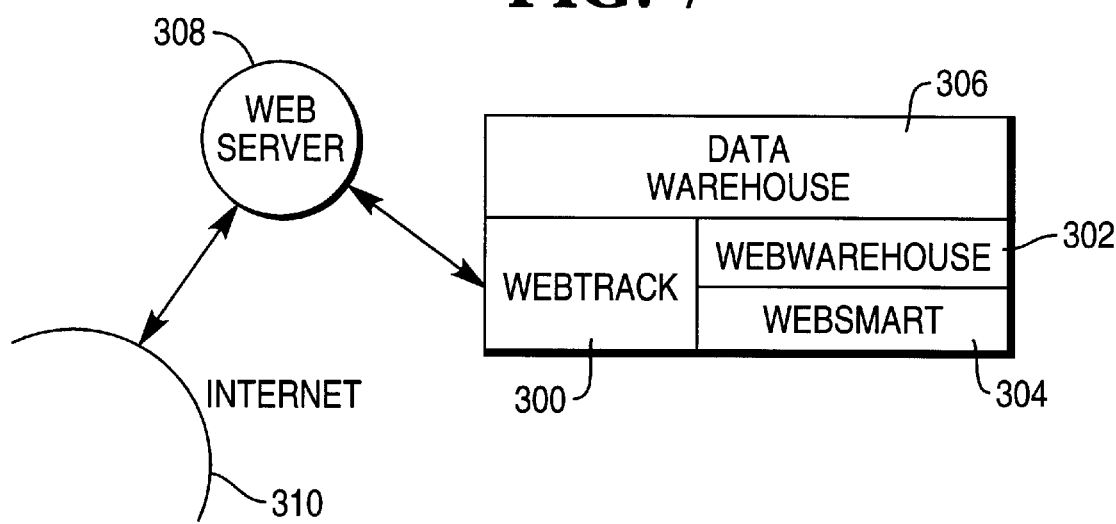
FIG. 7 provides a functional view of the system's elements in an Internet environment.

Each of the processes (find and collect, structure and store, analysis and discovery) corresponds to a system component in this section. FIG. 7 provides a functional view of the system's elements in an Internet environment. The system's elements of the architecture of the present invention are:

1. tracking module (WebMap or WebTrack) 300: systems to find, collect, refine, and translate detailed customer Web/Internet and/or electronic commerce usage and demographics data.

2. storage module (Web Warehouse) 302: Scaleable Data Warehouse to structure, organize, storage and manage detailed customer Internet and/or electronic commerce data.

3. intelligent decision support tool (WebSmart) 304: business solutions based on knowledge analysis and discovery of detailed customer Internet and/or electronic commerce data.

In addition, a general data warehouse 306 is also provided for storage of non-web specific data, as well as possibly some web specific data based on user preferences.

In addition, the presentation of the information is also important to the decision support process. It is a delivery media to distribute the information and intelligence to the decision maker in a timely fashion. Therefore, all these systems provide consistent, personalized, and easy to use customer interfaces. These user interfaces may also have the capabilities to operate in real-time, on-line, and/or off-line.

Figure 8:
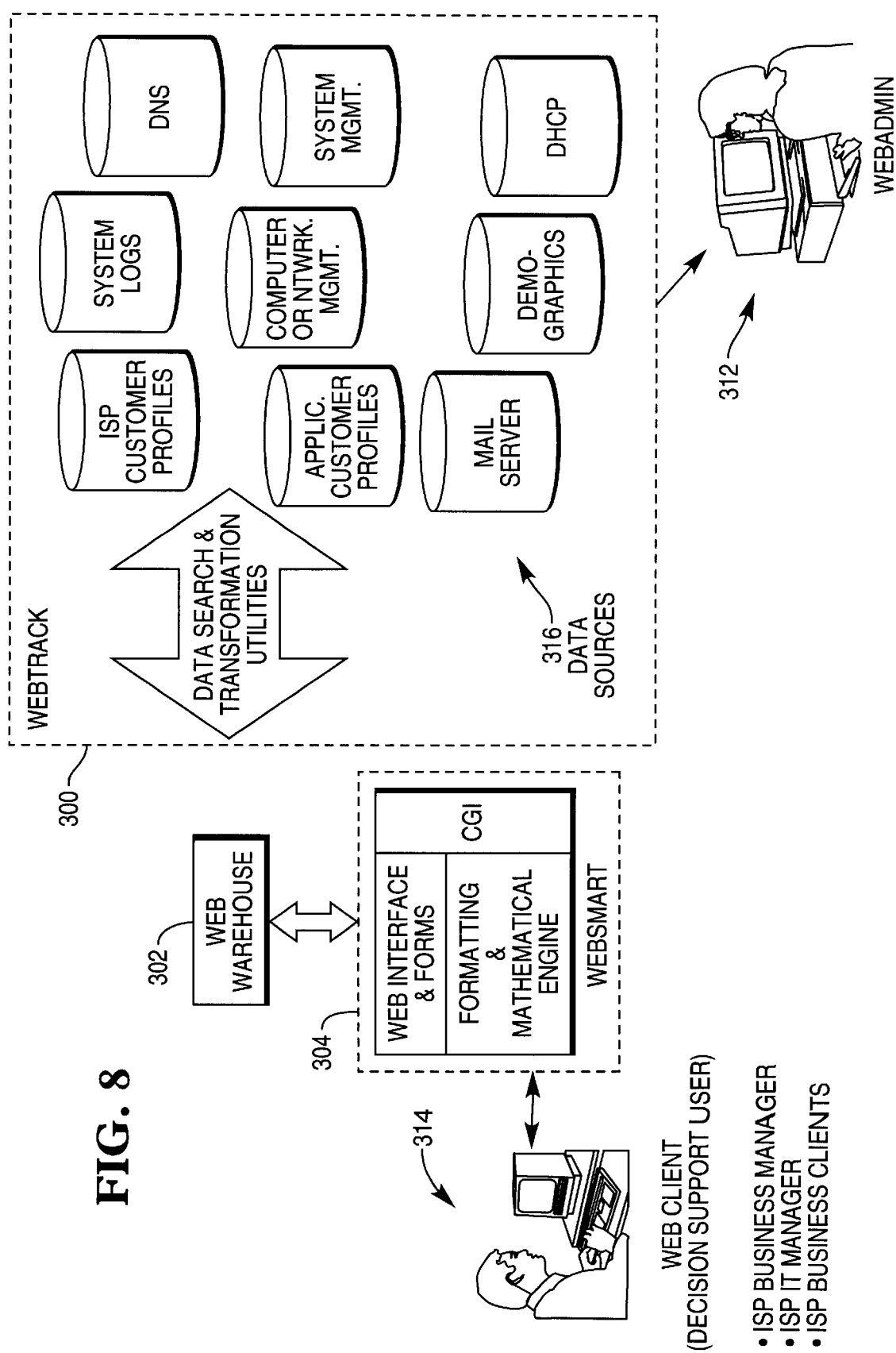
FIG. 8 provides an expanded view of the architecture of the present invention.

FIG. 8 provides an expanded view of the architecture of the present invention. In FIG. 8, the users define and formulate the business questions and determine the queries of the data collected. Three major decision support user categories of the present invention are:

1. CSP/ISP business managers: the present invention allows them to better understand their customers' needs and conduct effective marketing and sales support to achieve their business objectives.
2. ISP/CSP IT (Information Technology) Managers: the present invention enables them to obtain insight into the ISP's IT operations and provide ways to improve the ISP's services.
3. ISP/CSP business clients: For the ISP's hosted business clients, the present invention enables ISPs to provide their business clients with detailed understanding about the clients' business needs.

These users should be able to use the present invention through any Web client or networked client with properly defined access privileges and procedures. The interface must allow dynamic interaction between the users and the systems to accommodate the new queries and questions resulting from the changing business needs. This user input is handled according to the current Web and user interface technologies such as HTML forms and Common Gateway Interface (CGI) interacting with the other elements (WebSmart, WebWarehouse) of the WebMining systems.

WebSmart 304 provides the mathematical Engine to perform the statistic and analytical manipulation of the data and obtain the knowledge and intelligence for business decisions by the SmartEC client 314.

WebWarehouse 302 is separated from the operational Web-accessible systems such as Web servers and Web-Based databases, but is populated by data from these systems. It exists to make the data available for interrogation by the business users from the perspectives of an enterprise interest and associated business benefits. The data in the WebWarehouse is preferably time-stamped and associated with a defined period of time, and is usually subject-oriented such as customer, product, activity.

The change of this data in the WebWarehouse occurs as a result of decision support requirements, and update from one of the data sources 316. Therefore, the Administrator 312 must have the capabilities to determine and control the search request and information flow between the operational databases and the WebWarehouse. The Administrator must also have the ability to initiate the structural change, addition, and deletion of data in the WebWarehouse in an appropriate time based on the decision support user's needs.

WebTrack or WebMap 300 is the vehicle to search and transform the information from the data sources 316, and deliver the information to the WebWarehouse for storage using a network. The data sources preferably includes the system logs (access logs, agent logs, mail logs, communication server logs, accounting logs and referer logs) on the Web server, proxy server or mail server, and the user profiles (ISP/CSP customers, visitors, and transient travelers (pass-throughs)).

From the Web operational perspectives, four major sets of information for Web applications and Web access must be also considered to determine the collection of useful data: (1) who is visiting, (2) what they are looking at, (3) what resources they are using, and (4) what action are they taking. There are other data sources available related to DNS, DHCP, and the Network Management Systems (NMS) which facilitate Web operations. In addition, the data sources should also consider third party analysis applications (based on the Web data).

The data required for the WebWarehouse depends heavily on the scope and objectives of the business problems to be solved. A preliminary and generic example of the WebWarehouse intended for solving the problems an ISP/CSP may face is described as follows:

From the user perspective, there are, at least, two types of users: visitors and the ISP's/CSP's customers. The ISP's/CSP's customers are those who subscribe to the ISP/CSP services by paying fees to the ISP/CSP. The visitors are those who access the services via other Web servers without payment to the particular ISP/CSP. The profile data related to the ISP/CSP customers should include, for example:

company name company administrator name user name address including city, state, zip code phone number including day, night and fax user login name and/or IP address email address chosen Point of Presences credit card information including card type, number, name on the card domain name billing contact user selection of ISP's/CSP's services including dial-up service, business ISDN service, corporate email service, server hosting, corporate web services.

user chosen service plans and associated pricing information.

The visitor profile data, in addition to the domain name and IP addresses, depends on how much information the visited applications can entice the visitors to provide and what the visitors are willing to share with the ISP/CSP.

From the Web operational service perspective, three activities are correlated: user, application (including hosting and commerce services), and access. Web servers contain minimal information about access from the networking point of view. The capture of Web access activity requires interfaces to other network accessible systems such as modem pools and routers. The user activity provides, for example, the following data;

domain names and IP addresses of the systems/users making the requests login names and IP addresses of the client systems accessing the site referer lists from where users are accessing the server most common visitor domains most common external references first time visitors returning visitors most frequent visitors visitors per visitor category visits per visitor category user demographics including geography, age, income, professional.

where do people come from when accessing this page where users or subscribers/visitors go from this page.

The activity provides, for example, the following data:

hits to the site new contents for the site number of files sent hot hits (most frequent accessed files)

most popular pages types of transactions date and time of transactions time spent on a particular page average time spent on a page
how many leave before the first page arrives
details of most popular objects
details of most popular pages
least popular objects
eleast popular pages
most popular entrance pages
most popular content categories
next click analysis
visits per content category
visits to content combinations In order to understand the efficiency of the ISP/CSP operation, it requires an underlying resource characterization to inter-relate the above activities. There are three aspects of this characterization: what the structure is (necessary Web site application/service structure, and the relationships—one-to-one, many-to-one, many-to-many), what actually happens (logs), and how well the systems are performing (performance). This characterization (please note that this remains to be defined) is important in setting up a useful WebWarehouse and provide adaptable services for the present invention. Sample data related to resource utilization includes, for example:

protocol used
file sizes transferred
response time
peak traffic periods
update interval
most common browser types
retrieval method
error activities
accounting information including billing records.

The present invention can be standalone or co-exist with the web server, data bases, and data warehouse. The present invention accommodates both NT and UNIX with appropriate systems tools and capacity to enable access to other web servers and other web-accessible systems and Internet-based systems or networked such as NMS and special application servers. The present invention operates, for example, in a pure ISP environment initially. The capabilities of the present invention are also extendable to the Mixed ISP/CSP and SmartEC (or ISP decision support) systems provider environment (such that SmartEC systems providers can offer professional services), the Intranet environment for business customers, and provide business customers using ISP/CSP hosting and Internet and/or electronic commerce services a logical perspective of how they are operating.

Figure 9:
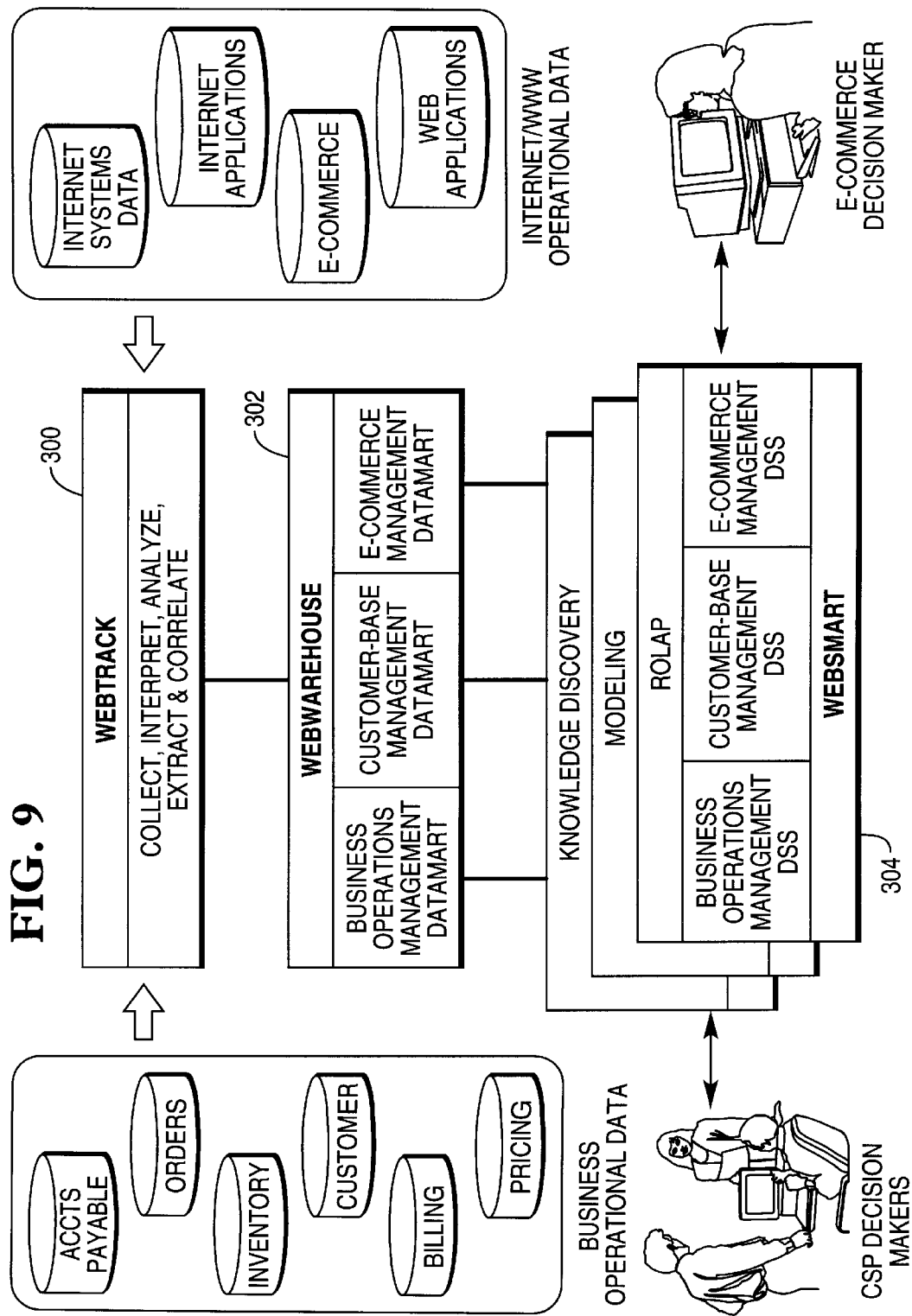
FIG. 9 is an illustration of the various data sources and outputs for the present invention.

As depicted in FIG. 9, the data to populate WebWarehouse 302 originates from many sources. The value of the present invention lies in its ability to integrate business operational data with web-specific and Internet and/or electronic commerce data to provide decision-support information about Internet/Web applications in a business, rather than a technical context.

WebMap or WebTrack 300 consists of the programs and database structures designed to:

Collect data from the appropriate sources.
Interpret, analyze, translate, and refine the source data in order to extract the required data sets to implement decision-support functions.
Correlate disparate data sets prior to populating WebWarehouse 302.

WebWarehouse 302 furnishes the information necessary to manage an Internet Service or an E-Commerce business from the perspectives outlined above. Different WebWarehouse views can be extracted to provide an information framework to drive specific decision-support efforts. WebWarehouse also includes tools that provide the appropriate logical design, physical design and documentation. Design templates are available to identify the required data elements from the customer's operational databases. There are also processes and tools to integrate customer-specific elements into WebWarehouse's core design. This architecture described herein may also be implemented as a datamart. A datamart is structured to support specific decision-support needs, typically at a departmental level.

WebSmart 304 provides decision-support modules with feature sets that vary in the sophistication of the business information being provided. In this context, there are several levels of decision-support provided by WebSmart.

functionality that provides a basic level of decision-support functionality functionality that can be addressed by standard OLAP decision-support software. At this level, WebSmart provides a set of pre-formatted report templates, filters and metrics for each decision-support feature set. There are tool sets for each DSS software package supported by WebMining.

functionality used to detect previously unknown, but potentially useful relationships between different types of data. Here, WebSmart provides a set of templates oriented to help solve specific business problems such as customer retention, market basket analysis, etc.

Additionally, Metadata is provided for each of the supported OLAP, On-Line Analitical Processing, or Knowledge Discovery (KD) tools, as appropriate. Metadata defines the data views necessary to produce the outputs required for each decision-support feature set. Each metadata package also includes templates to integrate customer-specific data into the standard design.

Figure 10:
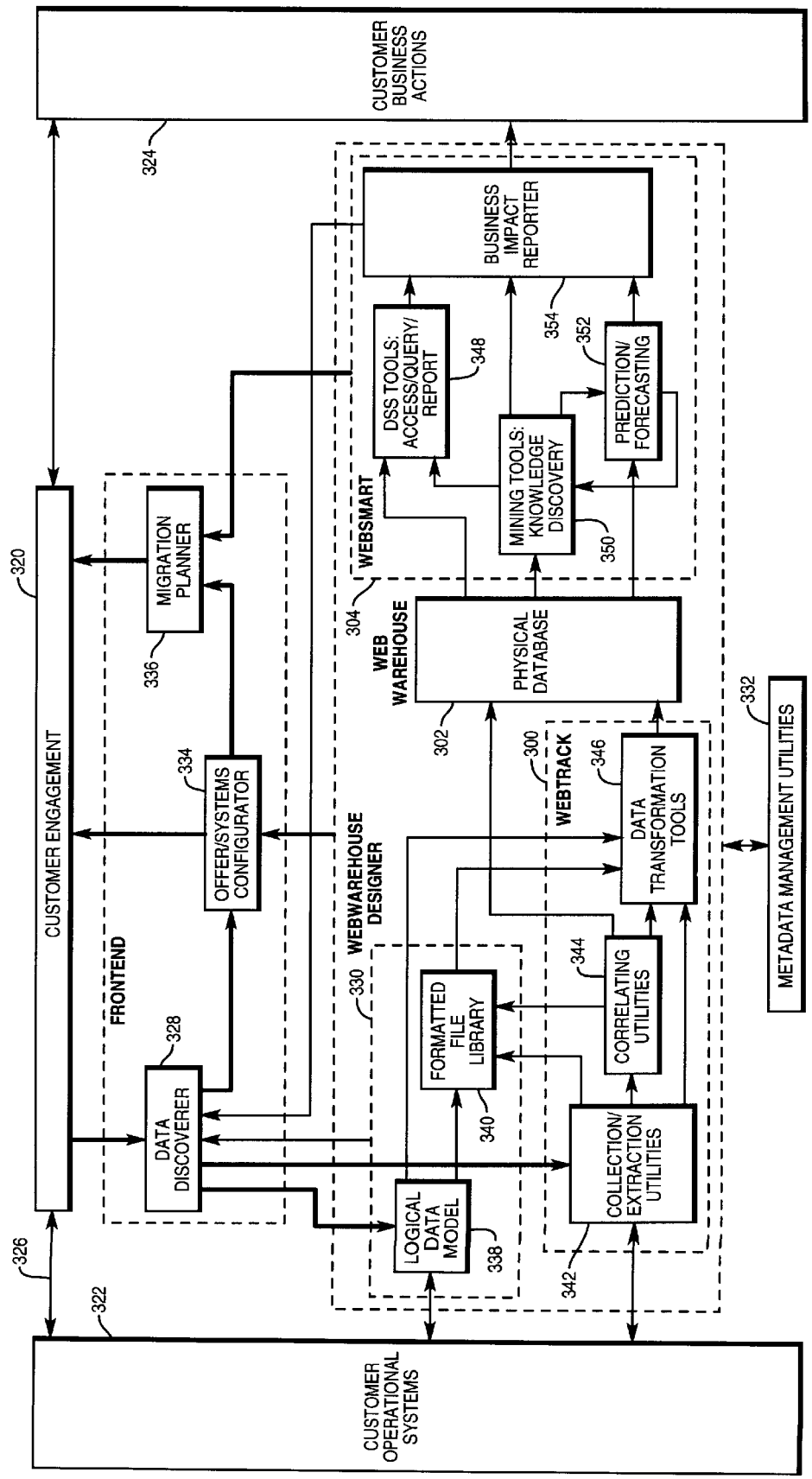
FIG. 10 is a detailed illustration of how the components interact with each other and the customer environment in the present invention.

FIG. 10 is a detailed illustration of how the components interact with each other and the customer environment. The present invention works under three environmental factors. Customer engagement 320 provides key information on customer needs. These needs are influenced by how well customer operational systems 322 are running and how customer business actions 324 are executed. The customer engagement process has a major influence on the design. The components must interact with customer operational systems to determine the proper model for WebWarehouse 302 and how the information can be collected and extracted for WebMap or WebTrack 300. Finally, the customer business actions depend heavily on what knowledge customers can get from the products and solutions.

WebSmart 304 is intended to provide the best possible knowledge for customers to conduct their business given a specific business problem. There are six key components in the present architecture:

WebMining Front-end 326 (Data Discoverer 328 and Offer/System Configurator 334 and Migration Planner 336)
WebWarehouse Designer 330
WebMap or WebTrack 300
WebWarehouse 302
WebSmart 304
WebMining Metadata Management Utilities 332

The WebMining Front-end facilitates the interaction between WebMining solutions and customers. Data Discoverer automates the discovery process to enable service practitioners to systematically find the necessary information for defining customer problems via customer engagement. The output of the Data Discoverer will impact the WebWarehouse design and determine the effectiveness of the collection and extraction utilities of WebTrack or WebMap.

The offer/systems configurator and migration planner function (WebMining Platform Selector) will help both customers and WebMining sales and service personnel to determine, depending on customer needs, what hardware, software and associated applications are required and how customers can move from one set of platforms to another based on the changing customer requirements.

WebWarehouse Designer contains two main components: logical data model 338 and formatted library 340. The logical data model provides overall descriptions of what the WebWarehouse is. This description will determine how well the WebWarehouse can integrate additional datasets and how effective the access of WebWarehouse will be for queries and reports. Formatted File Library is a by-product of conducting standard Collection/Extraction Utilities 342 and Tracking Utilities 344. The Formatted File Library provides the intermediate classifications such as process characterizations, customer descriptions, preference determination, and behavior patterns. These classifications can be reused in different technical process and different customer problems.

WebTrack or WebMap collects and extracts information from customer operational systems. The collected and extracted information will be further manipulated to determine the identity and characterization of the users via Mapping utilities. Data Transformation Tools 346 load the data into the WebWarehouse based on the principles of the WebWarehouse Designer and the information discovered during the execution of Collection/Extraction Utilities and Mapping Utilities.

WebWarehouse is the physical repository of SmartEC or WebMining information.

WebSmart provides the intelligence of the present invention. Decision Support Systems (DSS) tools 348 provide the access, query, and report capabilities using WebWarehouse. Mining tools 350 enable the present invention to discover hidden knowledge from existing data and information. Furthermore, Mining tools could establish systems model such that Prediction/Forecasting 352 capabilities can be realized. All these intelligence can be formulated such that the business impact can be clearly crystallized via Business Impact Report 354.

Since there are multiple systems and databases involved in providing WebMining solutions, it is important to properly manage, coordinate, and reconcile the different sets of metadata. Metadata Management Utilities serve as a control center of these different metadata for the present invention.

The above architecture is mainly examined from input and output process perspectives among physical components. The physical platforms required for the architecture described herein are described in FIG. 11. The present invention is capable of running on, for example, an NT or UNIX server and can be accessed by users through a browser or DSS/Data Mining Tools GUI interface via a network connection.

Figure 11:
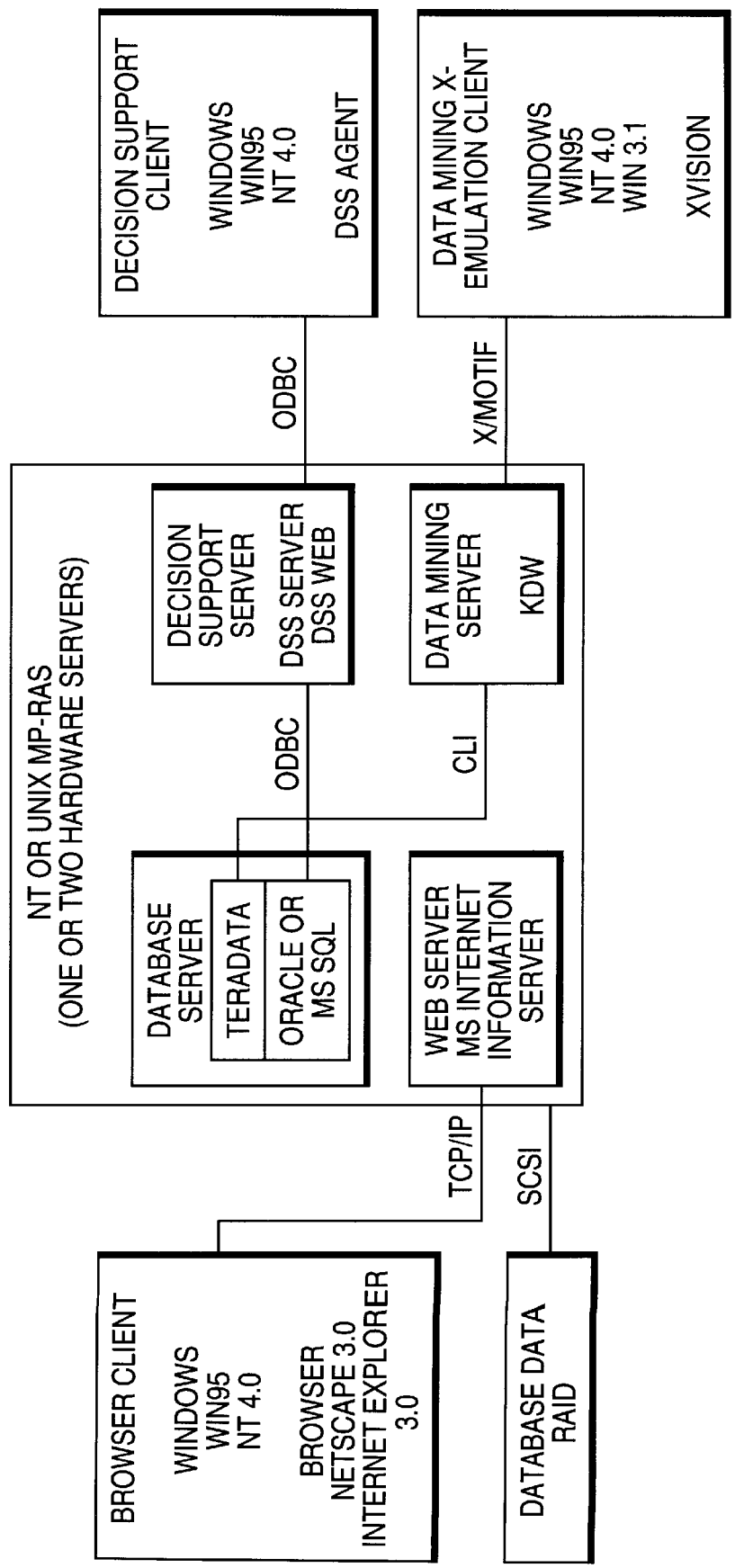
FIG. 11 provides an overview of the architectural components in various configurations of the present invention.

The system environment in FIG. 11 provides an overview of the architectural components in various configurations. DSS/Data Mining can run locally on the database platform or remotely on an NT or UNIX server attached to the database server via a network connection. FIG. 12 is a table providing additional hardware, software, database, and information tool options that may be used in conjunction with the present invention.

Figure 13:
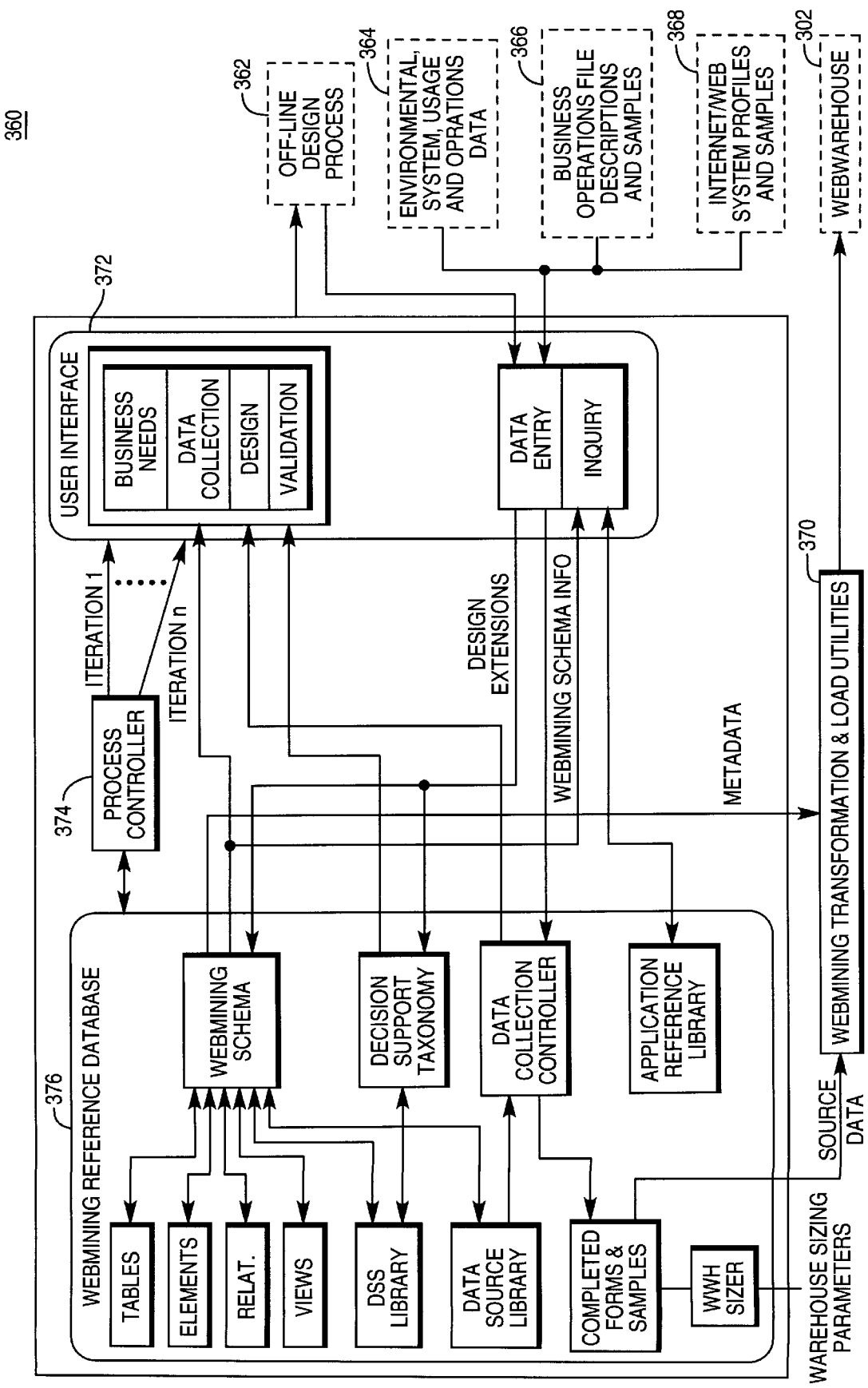
FIG. 13 is a detailed illustration of the data discoverer architecture in accordance with the present invention.

FIG. 13 is a detailed illustration of the data discoverer architecture in accordance with the present invention. The data discoverer 360 is a front-end tool used to automate as much as possible the discovery process on customer information and business rules. The data discoverer determines or protects the structure of the data stored in the WebWarehouse. Data Discoverer provides the following functions:

deletes, adds, updates information stored in the webwarehouse reports information to the customer to allow customer to review the information and provide feedback (e.g., which information customer wants to, or more interested in receiving, customized reporting)

provides a user interface for setting up new customers to collect information to begin webmining operation WebWarehouse 302 is populated with data extracted from two primary sources: the ISP's/CSP's business operational databases 364, 366 and various Internet or Web-based system files 368. The Internet/web data is relatively consistent from implementation to implementation. Minor variances will exist depending on whether the customer is running on UNIX or NT, the logging options selected by the CSP's/ISP;s and, in some cases, by the access hardware. These variances will impact the utilities that load the warehouse, but not its overall structure. The business operational data, on the other hand, may be unique for each CSP/ISP. WebWarehouse design templates take this into consideration by providing a fixed design for the consistent data and indicating, specifically, the type of data that must be extracted from the ISP's/CSP's operational systems to provide the functionality provided by WebSmart. User interface 372 interfaces or interacts with process controller 374 to store the data in reference database 376. User interface receives the data from the external sources via a data entry module for input into the various areas of the reference database, including schema, decision support taxonomy, data collection controller, or application reference library.

Each of these various database areas are organized to maintain the discovered data in accordance with a predetermined format. Accordingly, at the end of this phase, the structure and location of all source data required for the warehouse is defined via the reference database. During the data discovery phase, specific decision-support objectives are also established and calibrated against the mission statement of the business. The results of the data discovery phase are then used to determine what extensions are needed to the WebWarehouse and WebSmart core designs.

Figure 14:
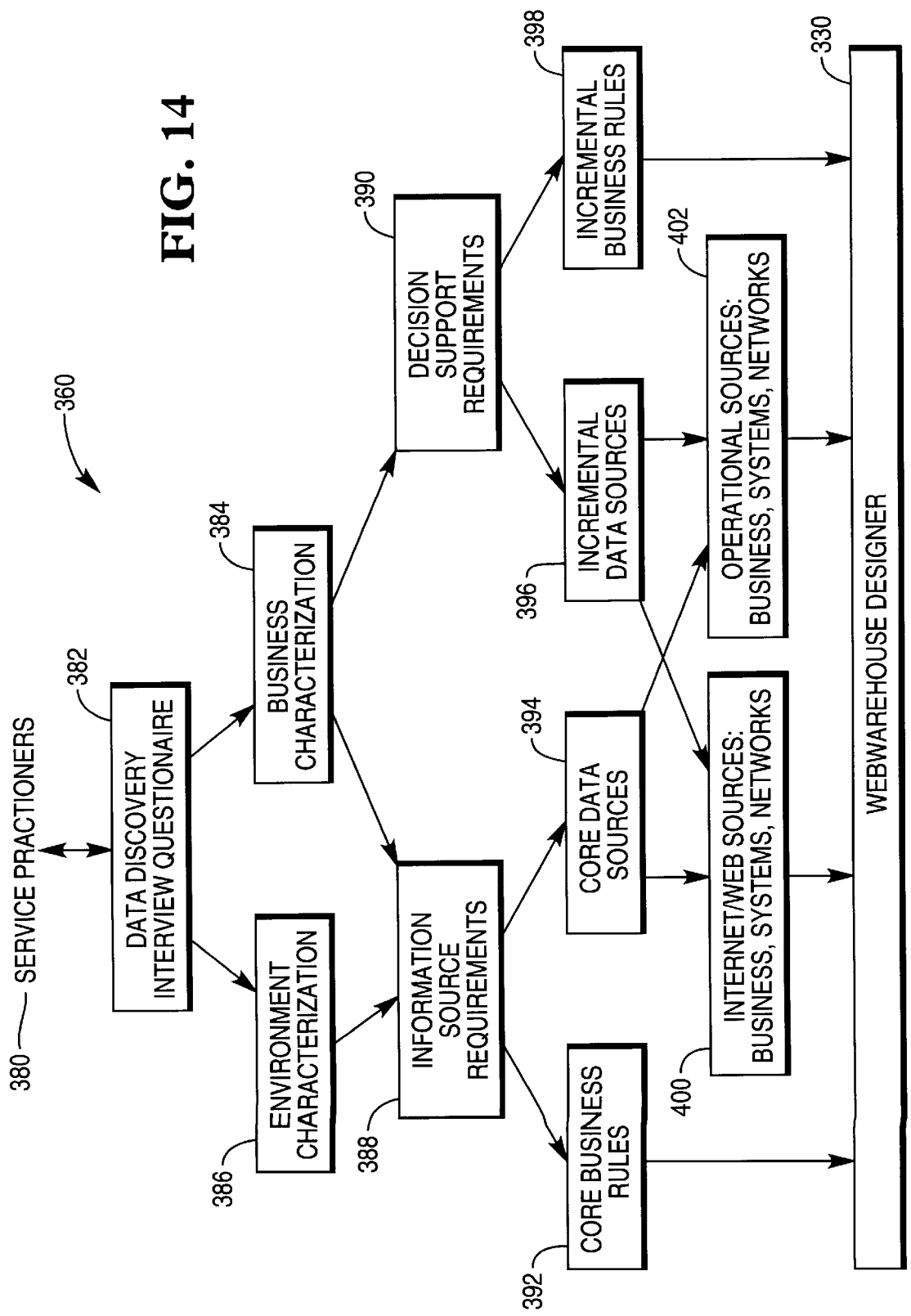
FIG. 14 is an illustration of a functional architecture of the data discoverer in accordance with the present invention.

FIG. 14 is an illustration of a functional architecture of the Data Discoverer in accordance with the present invention. The goal of the data discoverer 360 is to collect operational and business data, and then store the collected data in a well defined structure. The completed structure, also known as metadata, will provide the necessary input to WebWarehouse Designer, described above.

In FIG. 14, the service practitioner 380 starts the data discovery with an interview questionnaire 382. The questionnaire provides a structure to collect:

the data or location of the data a description of the data the environmental information about the data (e.g., how long user keep files on server without deleting, how current is data refreshed, how user updates information, how user manipulates data over time period, user POP or physical location)

volatility of the data

The data received via the questionnaire is then parsed, manually or automatically, into environmental characterization/related data 386 described above, and business related data 384. Examples of business related data include, e.g., pre-paid user, how user purchases services and products, discounts, billing rates, free subscriptions, free areas/information on web page.

Information source requirements 388 are determined from, or considers, at least one of the environmental characterization 386 or business characterization 384 when determining or populating the appropriate core business rules 392 and the appropriate core data sources 394 that fulfill the information source requirements. Information source requirements comprise, for example, identifies where, physical/logical location, the information, business/environment is located in a database.

Core business rules 392 comprise a minimum or predetermined set of rules used to administer the subscriber account, e.g., predefined rules for the customer to perform operations, discounts, rebates, use of subscriber information involving logon id per user, account id group of users, subscriber id internal database id, and the like. Core data sources 394 comprise the minimum data set which customer is required to supply to the webmining use data, e.g., users need logon id, valid account, and the like.

Decision support requirements 390 utilize the business characterization when parsing into incremental data sources 396 and incremental business rules 398. The decision support requirements customized support requirements, information needed by customer beyond the core set of report functionality, e.g., county of residence which is not normally collected. Core data sources 394 and incremental data sources 396 are then parsed into or pointed to the appropriate Internet/web source related information 400 and operational sources 402.

Internet/web source related information 400 and operational sources 402 are subsequently stored in WebWarehouse Designer 330, along with one or more core business rules 392 and incremental business rules 398. In this phase, the data discoverer will obtain the core data set 394. The core data set includes, but is not limited to, files, schema, tables, report, data elements and relationships.

The results of the data discovery process is highly iterative and highly dependent on the customers' needs. The purpose of data discovery is to achieve a starting point for a systematic way of discovering customer information. Interview templates are provided to guide the user through the process of identifying and recording information pertinent to WebWarehouse that describes the customers' information systems.

Business Operational Systems
        Database or file names
        Location of database or file
        Business rational for each database or file
        Database table descriptions and relationships
        Data element descriptions for database tables or files
        Business rules that dictate database or file data integrity
        Update policies and frequency
        Data volumes
        Data volatility
    Internet system logs
        The data discoverer also collects the following type of information:
            Locations of data collection points
            Data volumes
            Operating system type and version
            File formats
    . . . about the following server logs:
        Radius or accounting log—records information about access server sessions
        Access log—records information about requests to local web applications
        Proxy log—records information about requests to remote web applications
        Referer log—records information about hyperlinks between applications. In context of an application, log indicates who is linking to it
        Mail log The Data Discoverer is a self-contained Windows-based application that is capable of being run on a laptop computer. Data discovery occurs on the customer's premises. Data collection templates and processes are provided to inventory or store:

The types of services provided by the ISP/CSP
    Billing codes
    Service codes
    Subscriber identification codes
    On-line content
    Electronic commerce applications. With these types of applications, each one has a mutually exclusive business operations environment, customer base and business rules.

Data collection templates and processes are provided to collect data pertinent to the customer's Internet service environment. Included are:

Location and attributes of POPs (Point of Presence)
    Topology and capacity of access facilities
    Topology and capacity of Internet facilities
    Types, names and locations of servers Data collection templates and processes are provided for the function of:

Validating the appropriateness of WebMining (SmartEC Decisions) provided decision-support functionality for the customer's specific business needs.
    Identifying and describing any additional business needs and/or decisional support functionality that will require extending WebMining's (SmartEC Decisions) core design and decision-support templates.

Information collected about the customer's operational environment, information systems, and business needs is formatted into readable data files that can be integrated into WebWarehouse metadata.

Figure 15:
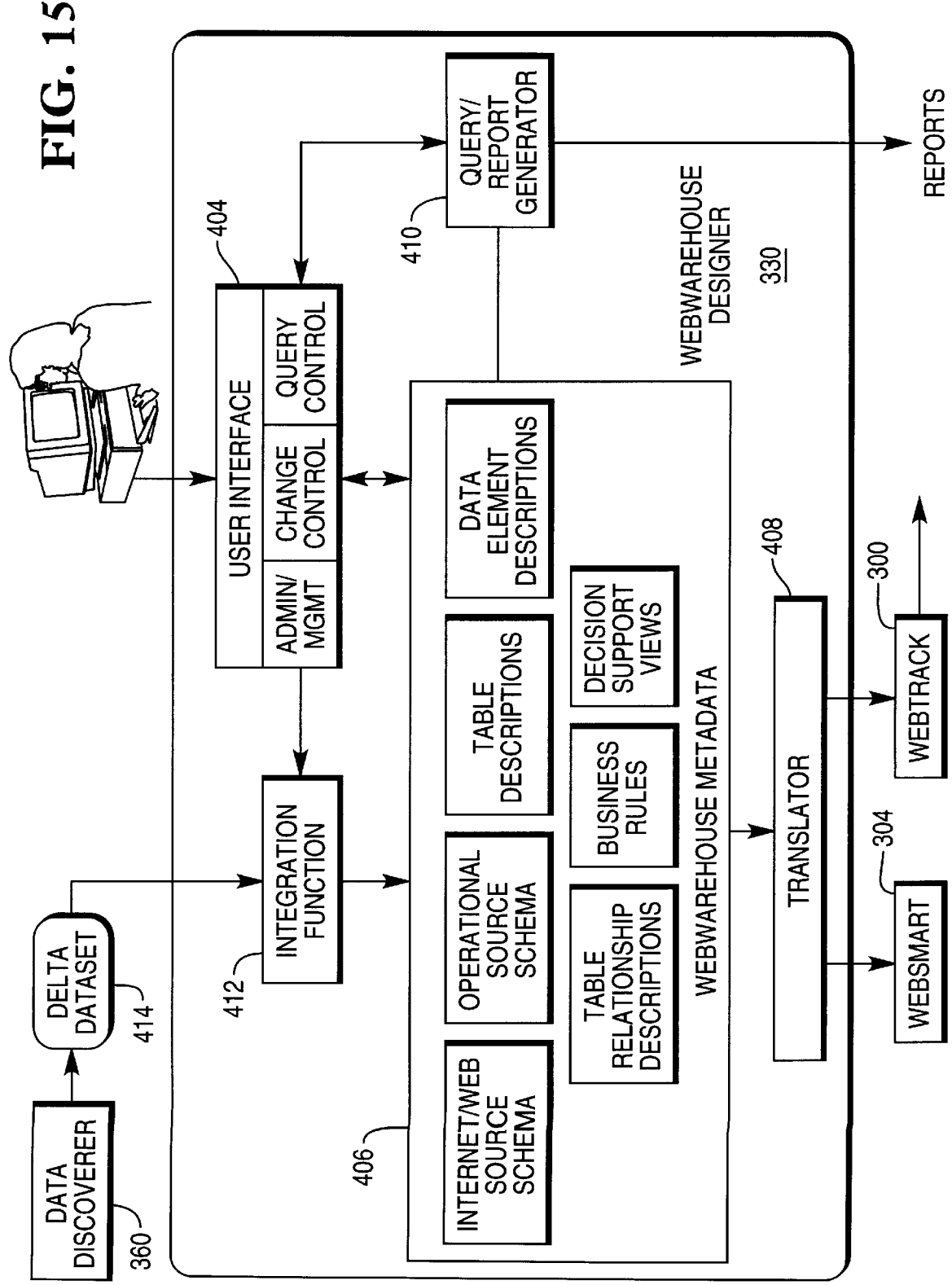
FIG. 15 is an illustration of the architecture of the WebWarehouse designer of the present invention.
Figure 17:
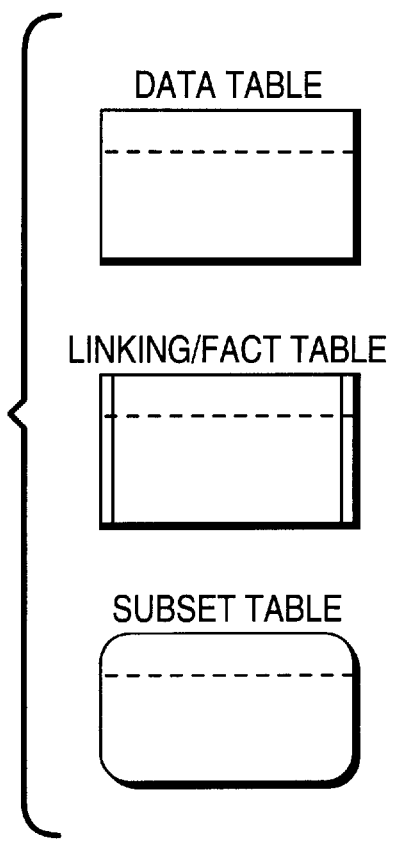
FIG. 17 is a table key indicating relationships and table types.

FIG. 15 is an illustration of the architecture of the WebWarehouse designer of the present invention. WebWarehouse designer 330 provides a core design that is tailored for the decision-support functions provided by WebSmart 304. Extensions to this design, however, are required to accommodate the CSP's/ISP's operational data and, perhaps, any additional decision-support requirements that surfaced during the data discovery phase. WebWarehouse designer 330 contains two main components: logical data model and formatted library. The logical data model provides overall descriptions of what the structure of the WebWarehouse is. This description determines how well the WebWarehouse can integrate additional datasets, how effective the access of WebWarehouse will be for query and report. Formatted File Library is a by-product of conducting Collection/Extraction Utilities and Mapping Utilities. The Formatted File Library provides the intermediate classifications such as process characterizations, customer descriptions, preference determination, and behavior patterns. These classifications can be reused in different technical process and different customer problems.

Tables, relationships, keys and data elements are integrated in the WebWarehouse metadata database 406. Also integrated are the locations and descriptions of the source data described during data discovery, business rules, database integrity conventions and decision support views. The result is metadata that describes, for example, the specific implementation of WebWarehouse that is administered by the WebWarehouse designer. Metadata is data about data. Metadata keeps track of and defines what is in the data warehouse, as well as the sources of data feeding the warehouse.

WebWarehouse Designer is optionally a Windows-based design tool that provides the appropriate logical, physical design and documentation for each WebMining datamart or data warehouse. Also provided are the design templates required to integrate the data elements from the CSP's/ISP's operational databases into the appropriate datamart. These tools are intended to be used by either services practitioners or the customer's information systems staff. The metadata is implemented, for example, in a standard RDBMS format that is compatible with the RDBMS used to implement WebWarehouse. Other data formats may also be used so long as a similar format is used or compatible between the WebWarehouse Designer and the WebWarehouse.

WebWarehouse Designer is capable of reading a dataset and integrating the data into the WebWarehouse metadata. The location and format of customer-provided data is recorded during the data discovery process. The Data Discoverer 360 tool produces an output dataset filtered via the delta dataset module 414 used to only transmit data that has been altered to the WebWarehouse designer. that describes this information in a predetermined format.

The data discovery dataset is integrated into the core design by the integration function 412. Admin/Management in user interface 404 provides for Database Administrator (DBA) control and status, as required, during the integration process. Provisions are provided to allow a database administrator or decision support specialist to interact with the system. Change Control function in the user interface 404 allows elements to be added to the metadata 406 manually by a database designer. This allows changes and enhancements to be made. Query Control in the user interface 404 provisions for queries and reports when the metadata is established. This will provide the WebWarehouse documentation and will provide a reference for the decision-support analyst when designing new queries, reports or models.

The translator 408 provides a standard function for access to metadata 406 by either WebSmart 304 or WebTrack or WebMap 300. WebTrack or WebMap 300 requires definitions of customer-provided and Internet/Web elements in order to manipulate datasets during the WebWarehouse load process. Query/report generator 410 interfaces with user interface to output reports in paper or electronic form.

The metadata is extensible. The metadata contains a description of each warehouse element that is included in the WebWarehouse core design. The core design provides the information structure that supports WebSmart's pre-defined decision-support functionality, i.e., information source requirements described above. The core design provided with the system can be extended to implement any additional functions desired by the customer, i.e., decision support requirements described above in connection with the Data Discoverer. Also, data elements required from the customer's files or databases must also be identified and included.

Metadata will provide a comprehensive description of each WebWarehouse component and the sources of data used to populate Webwarehouse. The metadata comprises the following information:

Schema for Internet/Web data sources
  Type of system logs
  Description of each log
  Location of each log
  Data format for each log entry
  Operational considerations (e.g., frequency of data collection)
Schema for operational data sources
  Required data sources
  Schema describes the table, files and/or data elements that must be added to WebWarehouse to enable the decision-support functionality provided by, for example, WebSmart
  Table/file location
  Table/file responsible party
  Table/file description
  Table relationships (if database)
  Data element descriptions
  Customer extensions (describes the data sources necessary to implement customer desired extensions to WebWarehouse functionality).
  Table descriptions including Table type, Table name, Table description, Primary Key, Alternate key, Foreign key(s),
  Data Element Descriptions including Field Name, Label, Description, Parent Table, Shared by Alias, Data type, Length, Decimal places, Input mask, Display format, Legal characters, Key type, Uniqueness, Required value, Null support, Edit rules, Comparison boundaries, Operations allowed, Values entered by, Default value, Range of values
  Table Relationship Descriptions
  Business Rules
  Decision Support Views The core design of WebWarehouse includes data structures, tables and the core data elements required for each table. The material is organized by datamart. FIG. 16 is an illustration of the WebWarehouse data sources for the services portfolio management, subscriber base management, and application management.

Figure 19:
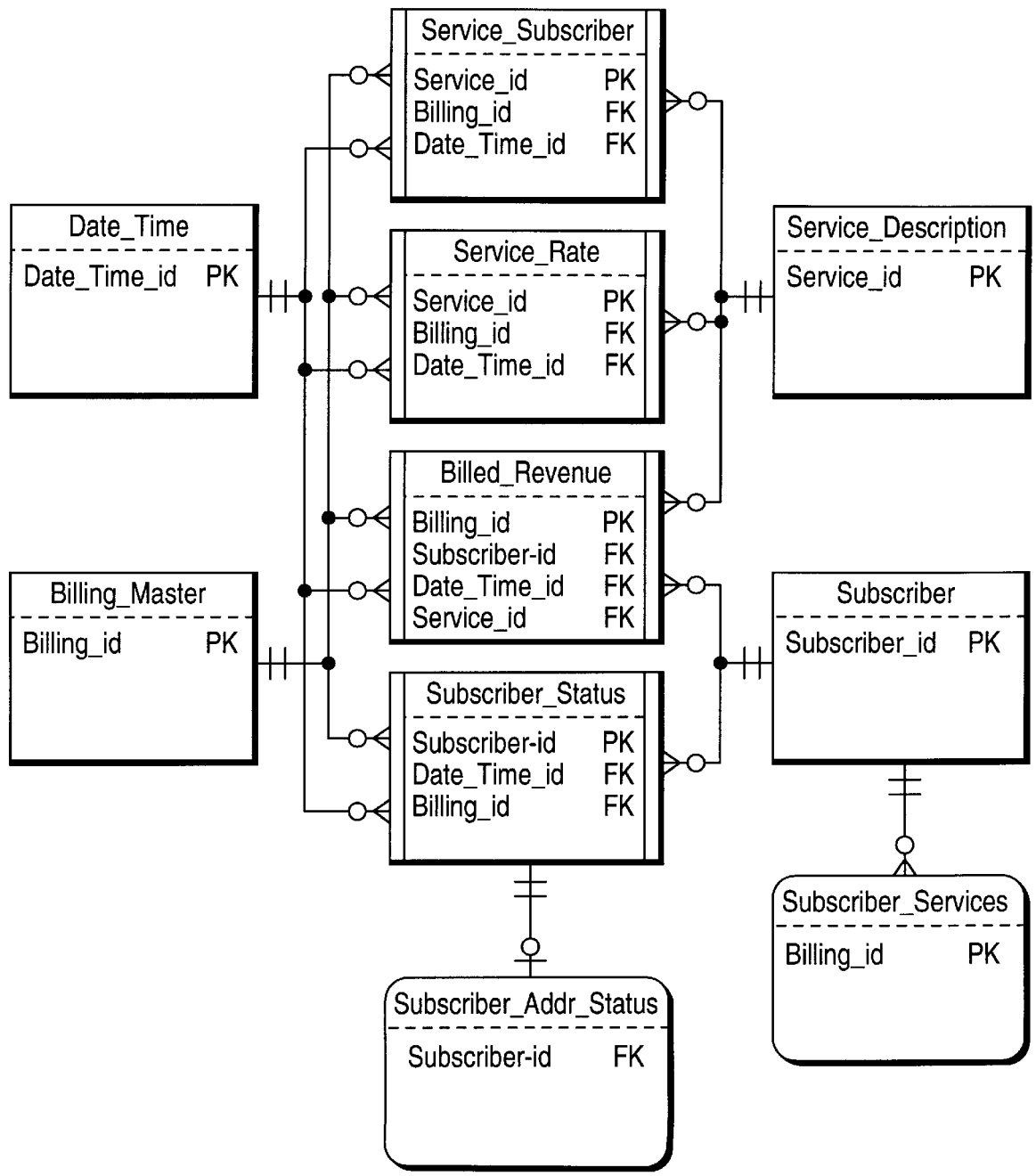
FIG. 19 is an exemplary data structure indicating subscriber service metrics data stored by the WebWarehouse designer and received from the data discoverer process.

FIG. 19 is an exemplary data structure indicating subscriber service metrics data stored by the WebWarehouse designer and received from the data discoverer process. The data structure section illustrates the tables used in a given datamart or data warehouse, the connections between tables that are related to one another and the types of relationships between them. Also shown are the primary and foreign keys. A primary key uniquely identifies the record in which it exists. A foreign key in one table is an attribute whose values are the values of a primary key in another table. The foreign key establishes a link between the two tables.

Figure 21A:
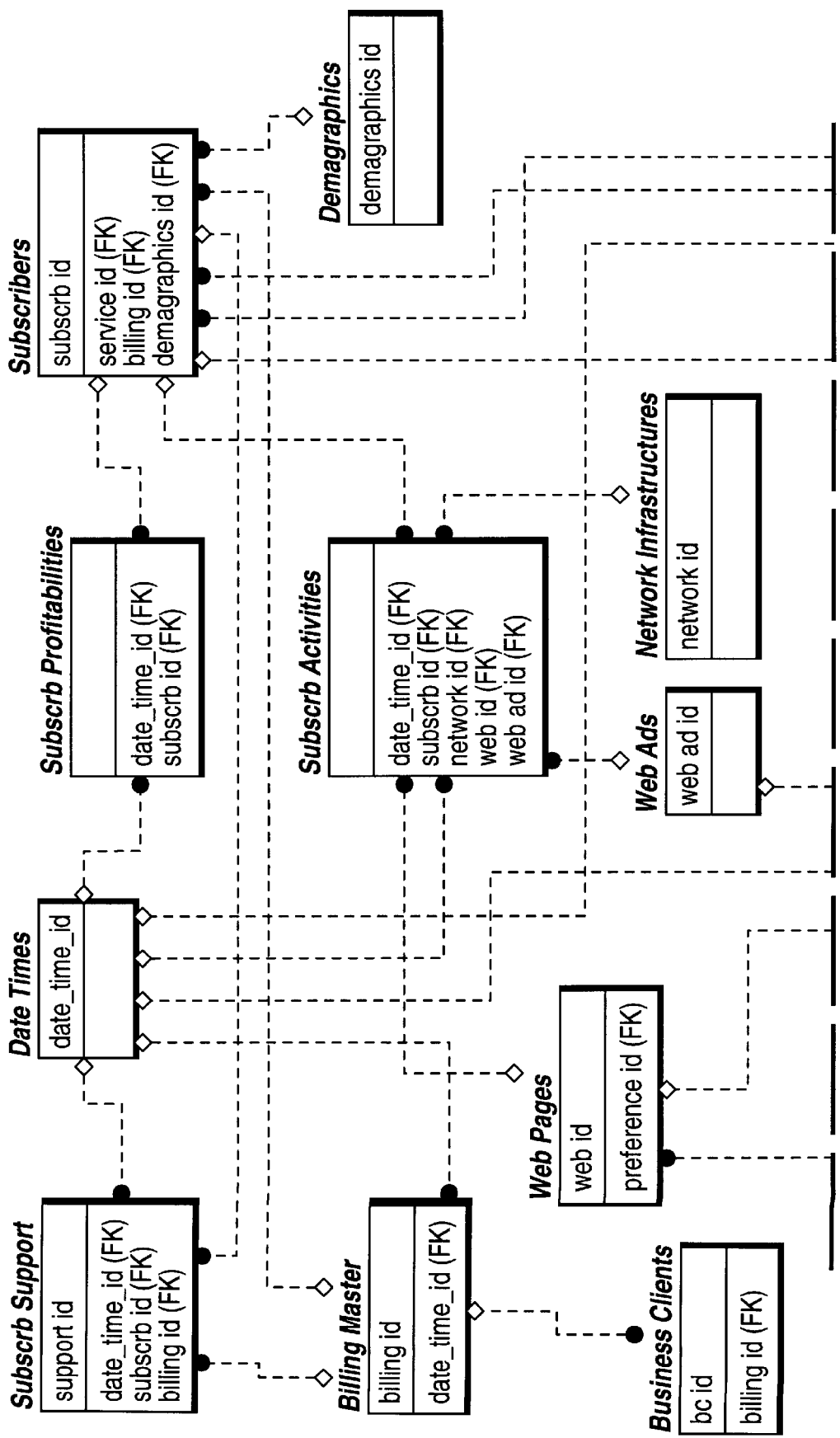
FIGS. 21A or 21B is a diagram describing the high level design or WebWarehouse indicating the various environmental and business data administered and/or collected by the data discoverer process.
Figure 21B:
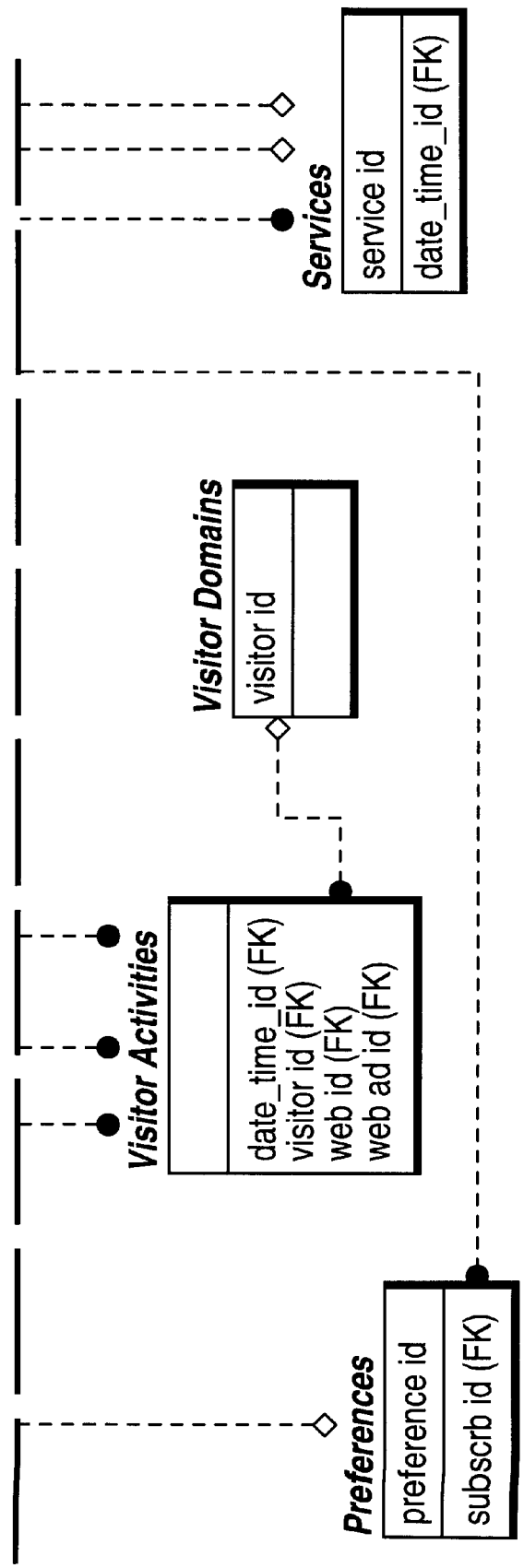

FIG. 20 is an exemplary table indicating subscriber service metrics data stored by the WebWarehouse designer and received from the data discovery process. The table section describes why each table is important to the functionality of the datamart. This core design reflects the set of business requirements that is expected to be substantially common from customer to customer. This core design is extensible to accommodate differences in customers' operational environments and business needs. Because of this and the broad scope of any data warehouse data mining effort, it is expected that the designs shown in this section will be modified and refined throughout the customer trial process. FIG. 21 is an exemplary table indicating the various environmental and business data administered and/or collected by the data discoverer process.

Figure 22:
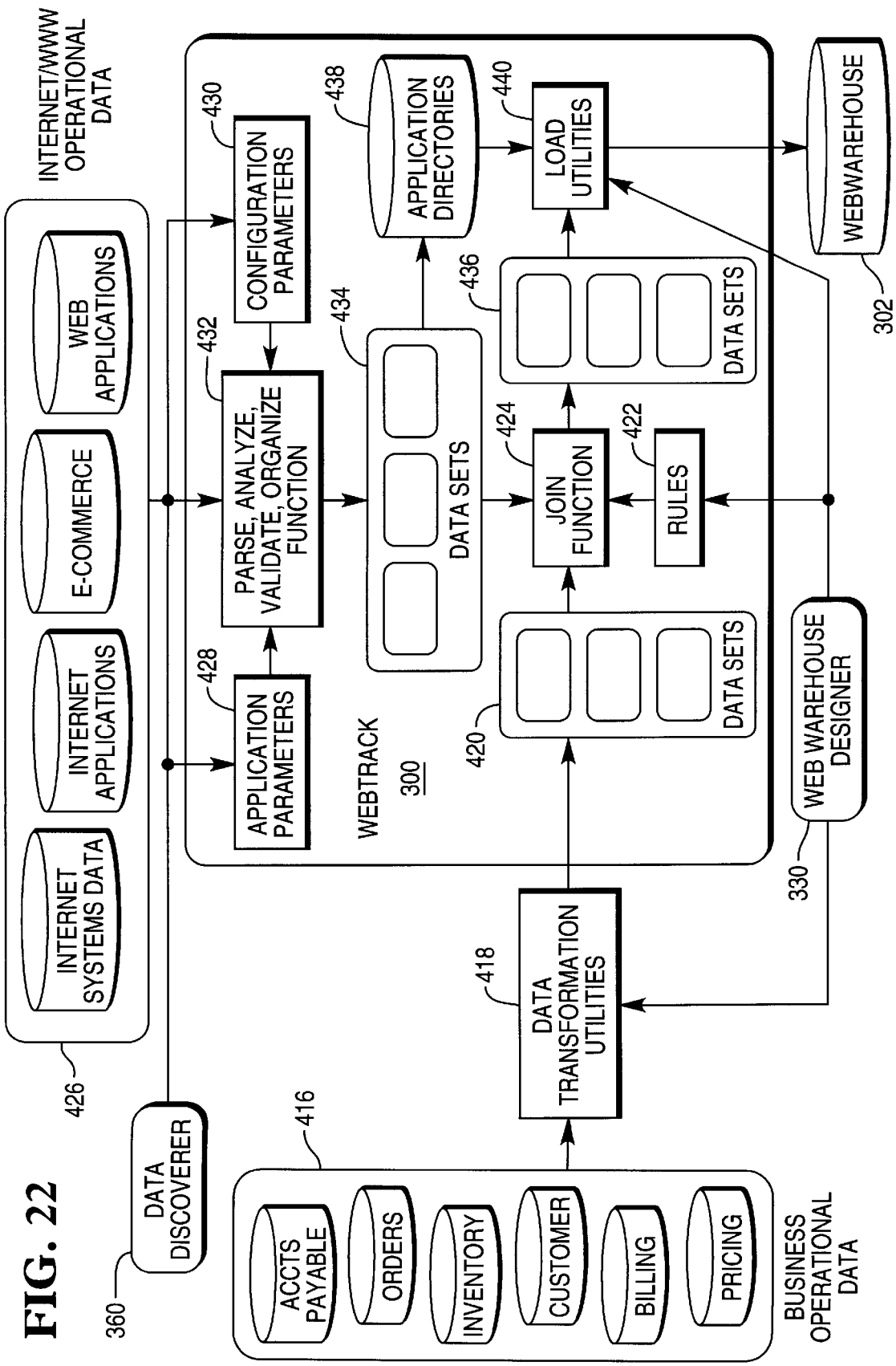
FIG. 22 is an illustration of the architecture of the mapping module of the present invention.

FIG. 22 is an illustration of the architecture of the mapping module of the present invention. The mapping module or WebMap is a process and set of tools that transforms data from the customer's data sources into the WebWarehouse. The WebMap system collects, interprets, analyzes, translates, refines and correlates customer Internet usage, Web/Internet application data, e-commerce application data and other operational data. WebMap performs the following functions:

Transforms and organizes business operational data into a format suitable to be loaded into WebWarehouse.

Analyzes, organizes and scrubs raw data pertaining to Internet sessions and accesses into a format suitable to be loaded into WebWarehouse.

Correlates Internet session, authorization and application access data to individual subscribers.

Creates directories of web categories to expedite the loading and access of information pertaining to on-line content or e-commerce applications.

Translates raw system data pertaining to electronic commerce applications into a business context.

These tools are intended to be used by either services practitioners or the customer's information service (IS) staff.

WebMap leverages existing standard RDBMS tools whenever possible. WebMap uses standard utilities and data transformation utilities to extract, scrub and transform operational data into a dataset suitable for loading into WebWarehouse. WebMap parses, analyzes, validates and/or organizes Internet/Web data prior to correlating it to operational data. WebMap leverages many customer application parameters that are identified during the data discovery process, such as directories of on-line or e-commerce content.

Configuration parameters, such as the locations of POPs (Point of Presence), servers, etc., identified during the data discovery process are also be leveraged to organize the intermediate data set. The data set produced by this process is stored in, for example, an RDBMS structure. Other standard structures may also be used. A join function correlates the Internet and operational data into one or more datasets prior to loading WebWarehouse.

Standard RDBMS technology is used, for example, to join the datasets. Other standard technology providing similar features may also be used. Information on the location (e.g. file, table or database names) and structure of the source data is provided by the metadata in WebWarehouse Designer. WebMap also provides the tools to create reference directories for on-line content and/or Internet and/or electronic commerce applications. These reference directories form the basis of lookup tables in WebWarehouse.

Standard tools, such as CyberPilot, are evaluated to create application directories and, if suitable, are integrated into WebMap. WebMap also provides utilities to parse the application directories as a basis to create lookup tables for subscriber-customer preferences. Standard load utilities provided by the RDBMS vendor, or other similar utilities, may be used in the final stage to load WebWarehouse (e.g., Oracle, MS SQL Server and Teradata).

As illustrated in FIG. 22, the WebMap system 300 collects, interprets, analyzes, translates, refines and correlates the business operational data 416 and the Internet/Web (or World Wide Web "WWW") operational data 426. Data Discoverer 360 provides WebMap 300 with application parameters 428 and configuration parameters 430. WebMap then parses, analyzes, validates and organizes in module 432 the Internet operational data 426 into data sets 434, responsive to the application parameters 428 and configuration parameters 430.

WebMap 300 receives business operational data 416 and transforms and organizes the business operational data into data sets 420 via standard data transformation utilities 418. WebWarehouse designer 330 provides the necessary metadata to data transformation utilities 418 and to load utilities 440 discussed below in more detail. Join function 424 correlates the Internet operational data sets 434 and business operational data sets 420 into one or more datasets 436, responsive to rules 422 provided via WebWarehouse designer 330, prior to loading into WebWarehouse 302.

WebMap 300 creates categories 438 of web categories responsive to data sets 434 to expedite the loading and access of information pertaining to on-line content or e-commerce applications. The categories are parsed as a basis to create lookup tables for subscriber-customer preferences. Load utilities 440 utilize the data sets 436 and application directories 438 to load WebWarehouse database 302 with data in a suitable format.

Accordingly, as described above, the present invention combines improved methods of data collection and translation with enhanced analysis techniques to exploit the vast amount of information available through emerging uses of the web, and other Internet-based systems. The results can be used as part of a customer's decision support system to allow better (e.g., more statistically valid) business decisions to be made faster.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. In a computer system for supporting and analyzing Internet and/or electronic commerce data over the world wide web for service providers including at least one of commerce service providers and Internet service providers received from one or more sources, the computer system including at least one user station transmitting a user request, at least one server, connectable to said at least one user station, said at least one server providing said at least one user station access to one or more external data sources, and at least one data collection and analysis system, a mapping system for collecting, analyzing and/or transforming the Internet and/or electronic commerce data of the service providers for storage into a data storage area for subsequent retrieval and analysis, the Internet and/or electronic commerce data including at least one of business operational data and network operational data, said mapping system comprising:

a database storing the Internet and/or electronic commerce data for interrogation by the service provider; and at least one computer station, responsively connectable to said database and including data transformation and database load utilities, said at least one computer station performing at least one of the functions of:

transforming and organizing the business operational data into a format suitable to be loaded into said database;

analyzing, and organizing the network operational data pertaining to network sessions and accesses into the format suitable to be loaded into said database;

analyzing, and organizing the web server operational data pertaining to web page requests, accesses, and browsing into the format suitable to be loaded into said database;

correlating the network sessions, accounting data, authorization data and web access data to at customers including at least one of individuals and groups;

creating categories to facilitate the loading and access of information pertaining to on-line content or Internet and/or electronic commerce applications;

translating raw system data pertaining to Internet and/or electronic commerce applications into at least one of a business and marketing context; and at least one of correlating the business operational data and the network operational data into one or more datasets prior to loading into said database, and referencing the one or more datasets in other databases.

2. A mapping system for collecting, analyzing and/or transforming the Internet and/or electronic commerce data of service providers for storage into a data storage area for subsequent retrieval and analysis according to claim 1, wherein the network operational data includes at least one of how long a user keeps files on a server without deleting, how current is user data refreshed, how the user updates the user data, how the user manipulates the user data over time, and user physical location.

3. A mapping system for collecting, analyzing and/or transforming the Internet and/or electronic commerce data of service providers for storage into a data storage area for subsequent retrieval and analysis according to claim 1, wherein the business operational data includes business data, and the business data includes at least one of pre-paid user data, how the user purchases services and products, user discounts, billing rates, and user free subscriptions.

4. A mapping system for collecting, analyzing and/or transforming the Internet and/or electronic commerce data of service providers for storage into a data storage area for subsequent retrieval and analysis according to claim 1, wherein the Internet and/or electronic commerce data information is retrieved from a distributed on-line, and interactive environment including multiple client browsers.

5. A mapping system for collecting, analyzing and/or transforming the Internet and/or electronic commerce data of service providers for storage into a data storage area for subsequent retrieval and analysis according to claim 4, wherein the multiple client browsers are capable of accessing a web server storing information.

6. A mapping system for collecting, analyzing and/or transforming the Internet and/or electronic commerce data of service providers for storage into a data storage area for subsequent retrieval and analysis according to claim 5, wherein the multiple client browsers are capable of accessing a web server or server storing information including customer support material and sales campaign schedules.

7. A mapping system for collecting, analyzing and/or transforming the Internet and/or electronic commerce data of service providers for storage into a data storage area for subsequent retrieval and analysis according to claim 1, wherein said database stores metadata, and the metadata is used to track and define the Internet and/or electronic commerce data and operational data stored in said database and sources of the Internet and/or electronic commerce data and the operational data feeding said database.

8. A mapping system for collecting, analyzing and/or transforming the Internet and/or electronic commerce data of service providers for storage into a data storage area for subsequent retrieval and analysis according to claim 1, wherein said database stores metadata, and the metadata provides a comprehensive description of each component and source of the Internet and/or electronic commerce data and operational data used to populate said database.

9. A mapping system for collecting, analyzing and/or transforming the Internet and/or electronic commerce data of service providers for storage into a data storage area for subsequent retrieval and analysis according to claim 1, wherein said database stores metadata, and the metadata comprises schema for Internet data sources, and schema for business data sources.

10. A mapping system for collecting, analyzing and/or transforming the Internet and/or electronic commerce data of service providers for storage into a data storage area for subsequent retrieval and analysis according to claim 9, wherein the schema for Internet data sources includes type of system logs, description of each log, location of each log, data format for each log entry, and operational considerations.

11. A mapping system for collecting, analyzing and/or transforming the Internet and/or electronic commerce data of service providers for storage into a data storage area for subsequent retrieval and analysis according to claim 9, wherein the schema for business data sources includes tables, files and/or data elements that must be added to said database to enable decision-support functionality.

12. A mapping system for collecting, analyzing and/or transforming the Internet and/or electronic commerce data of service providers for storage into a data storage area for subsequent retrieval and analysis according to claim 1, wherein the one or more datasets are stored in an RDBMS structure.

13. A mapping system for collecting, analyzing and/or transforming the Internet and/or electronic commerce data of service providers for storage into a data storage area for subsequent retrieval and analysis according to claim 1, wherein said at least one computer station joins the one or more datasets using RDBMS technology.

14. A mapping system for collecting, analyzing and/or transforming the Internet and/or electronic commerce data of service providers for storage into a data storage area for subsequent retrieval and analysis according to claim 1, wherein said at least one computer station generates one or more categories for at least one of on-line content and Internet and/or electronic commerce applications, and the categories form the basis of lookup tables in said database.

15. A mapping system for collecting, analyzing and/or transforming the Internet and/or electronic commerce data of service providers for storage into a data storage area for subsequent retrieval and analysis according to claim 14, wherein said at least one computer station parses the categories as a basis to generate one or more lookup tables indicative of subscriber-customer preferences.

16. A method of collecting, analyzing and/or transforming the Internet and/or electronic commerce data of service providers including at least one of commerce service providers and Internet service providers received from one or more sources, for storage into a data storage area for subsequent retrieval and analysis, the Internet and/or electronic commerce data including at least one of business operational data and Internet operational data, said method comprising the steps of:

(a) storing in a database the Internet and/or electronic commerce data for interrogation by the service provider;

(b) performing by at least one computer station at least one of the functions of:

(1) transforming and organizing the business operational data into a format suitable to be loaded into the database;
(2) analyzing, and organizing the web server operational data pertaining to web page requests, accesses, and browsing into the format suitable to be loaded into said database;
(3) analyzing, and organizing the Internet operational data pertaining to Internet sessions and accesses into the format suitable to be loaded into the database;
(4) correlating the Internet sessions, and authorization and web server access data to customers including at least one of individuals and groups;
(5) creating directories of applications to facilitate the loading and access of information pertaining to on-line content or Internet and/or electronic commerce applications;
(6) translating raw system data pertaining to Internet and/or electronic commerce applications into a business context; and
(7) correlating the business operational data and the Internet operational data into one or more datasets prior to loading into said database.

17. A method for collecting, analyzing and/or transforming the Internet and/or electronic commerce data of service providers for storage into a data storage area for subsequent retrieval and analysis according to claim 16, wherein the Internet operational data includes at least one of how long a user keeps files on a server without deleting, how current is user data refreshed, how the user updates the user data, how the user manipulates the user data over time, and user physical location.

18. A method for collecting, analyzing and/or transforming the Internet and/or electronic commerce data of service providers for storage into a data storage area for subsequent retrieval and analysis according to claim 16, wherein the business operational data includes business data, and the business data includes at least one of pre-paid user data, how the user purchases services and products, user discounts, billing rates, and user free subscriptions.

19. A method for collecting, analyzing and/or transforming the Internet and/or electronic commerce data of service providers for storage into a data storage area for subsequent retrieval and analysis according to claim 16, wherein the Internet and/or electronic commerce data information is retrieved from a distributed on-line, and interactive environment.

20. A method for collecting, analyzing and/or transforming the Internet and/or electronic commerce data of service providers for storage into a data storage area for subsequent retrieval and analysis according to claim 19, wherein the multiple client browsers are capable of accessing a web server storing information.

21. A method for collecting, analyzing and/or transforming the Internet and/or electronic commerce data of service providers for storage into a data storage area for subsequent retrieval and analysis according to claim 20, wherein the multiple client browsers are capable of accessing a web server or server storing information including customer support material and sales campaign schedules.

22. A method for collecting, analyzing and/or transforming the Internet and/or electronic commerce data of service providers for storage into a data storage area for subsequent retrieval and analysis according to claim 16, wherein said database stores metadata, and the metadata is used to track and define the Internet and/or electronic commerce data stored in said database and sources of the Internet and/or electronic commerce data feeding said database.

23. A method for collecting, analyzing and/or transforming the Internet and/or electronic commerce data of service providers for storage into a data storage area for subsequent retrieval and analysis according to claim 16, wherein said database stores metadata, and the metadata provides a comprehensive description of each component and source of the electronic commerce data used to populate said database.

24. A method for collecting, analyzing and/or transforming the Internet and/or electronic commerce data of service providers for storage into a data storage area for subsequent retrieval and analysis according to claim 16, wherein said database stores metadata, and the metadata comprises schema for Internet data sources, and schema for business data sources.

25. A method for collecting, analyzing and/or transforming the Internet and/or electronic commerce data of service providers for storage into a data storage area for subsequent retrieval and analysis according to claim 24, wherein the schema for Internet data sources includes type of system logs, description of each log, location of each log, data format for each log entry, and operational considerations.

26. A method for collecting, analyzing and/or transforming the Internet and/or electronic commerce data of service providers for storage into a data storage area for subsequent retrieval and analysis according to claim 24, wherein the schema for business data sources includes tables, files and/or data elements that may be added to said database to enable decision-support functionality.

27. A method for collecting, analyzing and/or transforming the Internet and/or electronic commerce data of service providers for storage into a data storage area for subsequent retrieval and analysis according to claim 16, wherein the one or more datasets are stored in an RDBMS structure.

28. A method for collecting, analyzing and/or transforming the Internet and/or electronic commerce data of service providers for storage into a data storage area for subsequent retrieval and analysis according to claim 16, wherein said at least one computer station joins the one or more datasets using RDBMS technology.

29. A method for collecting, analyzing and/or transforming the Internet and/or electronic commerce data of service providers for storage into a data storage area for subsequent retrieval and analysis according to claim 16, wherein said at least one computer station generates one or more reference directories for at least one of on-line content and Internet and/or electronic commerce applications, and the reference directories form the basis of lookup tables in said database.

30. A method for collecting, analyzing and/or transforming the Internet and/or electronic commerce data of service providers for storage into a data storage area for subsequent retrieval and analysis according to claim 16, wherein said at least one computer station parses the categories as a basis to generate one or more lookup tables indicative of subscriber-customer preferences.

31. A computer program memory, storing computer instructions to collect, analyze and/or transform Internet and/or electronic commerce data of service providers including at least one of Internet service providers and commerce service providers received from one or more sources for storage into a data storage area for subsequent retrieval and analysis over one or more networks, the computer instructions including:
(a) storing in a database the Internet and/or electronic commerce data for interrogation by the CSP;
(b) performing by at least one computer station at least one of the functions of:
(1) transforming and organizing the business operational data into a format suitable to be loaded into the database;

(2) analyzing, and organizing the web server operational data pertaining to web page requests, accesses, and browsing into the format suitable to be loaded into said database;
(3) analyzing, and organizing the network operational data pertaining to network sessions and accesses into the format suitable to be loaded into the database;
(4) correlating the network sessions, and authorization and application access data to customers;
(5) creating directories of applications to facilitate the loading and access of information pertaining to on-line content or Internet and/or electronic commerce applications;
(6) translating raw system data pertaining to Internet and/or electronic commerce applications into a business context; and
(7) correlating the business operational data and the network operational data into one or more datasets prior to loading into said database.

* * * * *